US008677280B2

(12) United States Patent
Carmichael et al.

(10) Patent No.: US 8,677,280 B2
(45) Date of Patent: Mar. 18, 2014

(54) SPROCKET SHAPED USER INTERFACE FOR NAVIGATING A DYNAMIC COLLECTION OF INFORMATION

(75) Inventors: Christopher Carmichael, Laguna Niguel, CA (US); Connie Jordan, Laguna Niguel, CA (US)

(73) Assignee: Ubiquity Broadcasting Corporation, Irvine, CA (US)

( * ) Notice: Subject to any disclaimer, the term of this patent is extended or adjusted under 35 U.S.C. 154(b) by 129 days.

(21) Appl. No.: 13/205,422

(22) Filed: Aug. 8, 2011

(65) Prior Publication Data

US 2012/0079427 A1 Mar. 29, 2012

Related U.S. Application Data

(63) Continuation-in-part of application No. 11/436,400, filed on May 18, 2006, now Pat. No. 7,996,788.

(60) Provisional application No. 61/480,434, filed on Apr. 29, 2011.

(51) Int. Cl.
*G06F 3/048* (2013.01)
*G06F 3/00* (2006.01)

(52) U.S. Cl.
USPC ........... 715/854; 715/810; 715/834; 715/841; 715/853; 725/37; 725/42; 725/44

(58) Field of Classification Search
USPC ......... 715/854, 853, 764, 810, 834, 779, 841, 715/822, 864, 765, 826; 725/37, 38, 42, 43, 725/44, 50; 345/158
See application file for complete search history.

(56) References Cited

U.S. PATENT DOCUMENTS

| 5,515,486 | A | 5/1996 | Amro et al. |
| 5,524,196 | A | 6/1996 | Blades |
| 5,644,736 | A | 7/1997 | Healy et al. |
| 5,878,213 | A * | 3/1999 | Bittinger et al. ............. 709/203 |
| 6,211,921 | B1 | 4/2001 | Cherian et al. |
| 6,219,053 | B1 | 4/2001 | Tachibana et al. |
| 6,236,398 | B1 | 5/2001 | Kojima et al. |
| 6,236,987 | B1 | 5/2001 | Horowitz et al. |
| 6,448,987 | B1 | 9/2002 | Easty et al. |
| 6,538,635 | B1 | 3/2003 | Ringot |
| 6,549,219 | B2 | 4/2003 | Selker |
| 6,628,313 | B1 | 9/2003 | Minakuchi et al. |
| 6,819,344 | B2 | 11/2004 | Robbins |
| 6,918,091 | B2 | 7/2005 | Leavitt et al. |
| 6,938,218 | B1 | 8/2005 | Rosen |

(Continued)

OTHER PUBLICATIONS

Nalts, "Hulu's "Confidential" Ad-Selector Specs Leaked; YouTube Adopts Mandatory Pre-Rolls," Feb. 13, 2010, willvideoforfood.com, pp. 1-5.*

*Primary Examiner* — Kieu Vu
*Assistant Examiner* — Asteway T Gattew
(74) *Attorney, Agent, or Firm* — Law Office of Scott C. Harris, Inc.

(57) ABSTRACT

The sprocket shaped menu accepts selections of information from the menu, where selecting an item in the menu causes other parts of the look of the menu to change. In one embodiment, this can cause a break in the menu which shows a preview. In another embodiment, touching an item on the menu can cause an automatic update of the other items unless those other items have been automatically updated within a predetermined time before, such as within 15 minutes.

12 Claims, 22 Drawing Sheets

(56) References Cited

U.S. PATENT DOCUMENTS

| | | |
|---|---|---|
| 7,013,435 B2 | 3/2006 | Gallo et al. |
| 7,036,091 B1 | 4/2006 | Nguyen |
| 7,093,201 B2 | 8/2006 | Duarte |
| 7,096,431 B2 | 8/2006 | Tambata et al. |
| 7,134,092 B2 | 11/2006 | Fung et al. |
| 8,145,124 B2 * | 3/2012 | Yassa .................. 455/3.04 |
| 2002/0075311 A1 | 6/2002 | Orbanes et al. |
| 2002/0085037 A1* | 7/2002 | Leavitt et al. ............. 345/765 |
| 2003/0046300 A1 | 3/2003 | Arai |
| 2003/0048309 A1* | 3/2003 | Tambata et al. ............. 345/810 |
| 2003/0167213 A1 | 9/2003 | Jammes et al. |
| 2003/0197724 A1 | 10/2003 | Reed |
| 2003/0197740 A1 | 10/2003 | Reponen |
| 2004/0135773 A1* | 7/2004 | Bang et al. .................. 345/173 |
| 2005/0010955 A1* | 1/2005 | Elia et al. .................. 725/88 |
| 2005/0050476 A1 | 3/2005 | SanGiovanni |
| 2006/0090139 A1 | 4/2006 | Jenni et al. |
| 2006/0095865 A1 | 5/2006 | Rostom |
| 2006/0279541 A1 | 12/2006 | Kim et al. |
| 2011/0055760 A1* | 3/2011 | Drayton et al. ............. 715/834 |

* cited by examiner

30

| 12 | 1 | 2 | 3 | 4 | 5 | ... |
|---|---|---|---|---|---|---|
| 14 | 1,1 | 2,1 | 3,1 | 4,1 | 5,1 | |
| | 1,2 | 2,2 | 3,2 | 4,2 | 5,2 | |
| | 1,3 | 2,3 | 3,3 | ⋮ | 5,3 | |
| | 1,4 | ⋮ | 3,4 | | ⋮ | |
| | 1,5 | | ⋮ | | | |
| | ⋮ | | | | | |

FIG. 4

SPROCKET SHAPED USER INTERFACE FOR NAVIGATING A DYNAMIC COLLECTION OF INFORMATION

This application claims priority from provisional application No. 61/480,434, filed Apr. 29, 2011.

This is a continuation in part of Ser. No. 11/436,400, filed May 18, 2006; now U.S. Pat. No. 7,996,788.

BACKGROUND

1. Field

The present invention generally relates to graphical user interfaces and more particularly relates to the navigation of dynamic collections of information.

2. Related Art

Navigation through collections of information is firmly rooted in conventional text based solutions. These conventional utilities were well suited to yesterday's low-bandwidth networks and limited processing power devices. In today's high-bandwidth, high processing power environments, however, conventional navigation utilities are increasingly becoming the bottleneck between a user desired information. Additionally, conventional navigation utilities typically present very different user interfaces across the various different types of collections of information. For example, databases, file systems, and web sites all have very different user interfaces, requiring users to be experienced and familiar with each interface.

Furthermore, conventional navigation systems continue to struggle with the presentation of information relating to the location, direction, and context of a user within a collection of information. Compounding this limitation of the conventional systems is the increasingly dynamic nature of collections of information and their tendency and ability to change while a user is interacting with the collection of information.

One significant drawback of conventional navigation systems is that a user can easily get lost within the hierarchical structure of the collection of information. This is typically due to a lack of context presented to the user, but can also be due to variations in the form of the user interface. For example, different graphical presentations of the navigation system may be found within the various web pages in a web site. The different graphical presentation may cause a user to become confused as to the current location with the collection of information.

Therefore, what is needed is a system and method that provides uniform navigation of dynamic collections of information and overcomes the significant problems found in the conventional systems as described above.

SUMMARY

Various systems and methods are presented that provide for the navigation of dynamic collections of information. A unified presentation shows the hierarchical relationship between the multiple levels of information content and allows for the simplified navigation between the levels. Navigating through the various levels of the collection of information causes the information to be recursively presented in a hierarchical fashion. Advantageously, as the information content may change, those changes are reflected in the hierarchical presentation of the structure of the collection of information. The various systems and methods presented may be used to navigate collections of information including web sites, computer file systems, databases, and other hierarchical systems.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 4 is a block diagram illustrating a table of dynamic content listings according to an embodiment of the present invention;

DETAILED DESCRIPTION

Certain embodiments as disclosed herein provide for the navigation of dynamic collections of information. For example, one method as disclosed herein allows a dynamic collection of information to be parsed into a dynamic content table that provides a user with the overall context of the collection of information in a simplified navigation system. The overall context can also be recursively updated as the user navigates within the dynamic collection of information, providing the user with a context sensitive road map for use in navigation.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
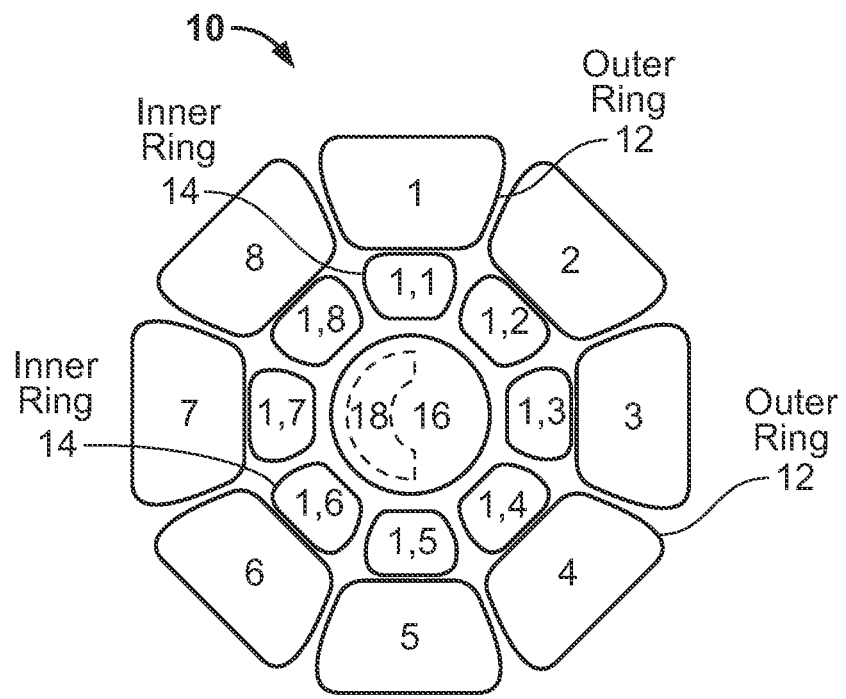
FIG. 1 is a block diagram illustrating a system for navigating a dynamic collection of information according to an embodiment of the present invention.

FIG. 1 is a block diagram illustrating a navigation system 10 for navigating a dynamic collection of information according to an embodiment of the present invention. The illustrated navigation system 10 comprises an outer ring 12, an inner ring 14, and an inner core 16. In the description of the various embodiments herein, the outer ring 12 may also be referred to as the top-level 12, the inner ring 14 may also be referred to as the sub-level 14, and the inner core 16 may also be referred to as the core-level 16. Additionally, the navigation system 10 may comprise more or less rings or levels. For example, certain embodiments of the navigation system 10 may comprise three or four rings in addition to the inner core.

The outer ring 12 has a variable number of elements. For example, in the illustrated embodiment, outer ring 12 has eight elements, numbered 1-8 respectively. Similarly, inner ring 14 has a variable number of elements. The elements of inner ring 12 are context sensitive based on the element of the outer ring 12 that is currently in focus, or currently selected. As illustrated, the inner ring 14 comprises eight elements. Each element in the inner ring is numbered as a tuple, e.g., (X,Y), where the first number (X) represents the outer ring element currently in focus and the second number (Y) represents the number of the inner ring element. For example, an inner ring element with the tuple (2,5) indicates that the second outer ring element is currently in focus in combination with the fifth inner ring element.

Navigation system 10 additionally comprises an inner core 16 that occupies the central portion of the wheel shaped navigation system 10. Additionally, navigation system 10 may have an optional inner core element 18 that is located within or adjacent to the inner core 16. Although the illustrated navigation system 10 is presented in the form of a wheel or a semicircle in the various embodiments herein, it is understood that the scope of the present invention encompasses alternative presentations for the navigation system 10 that include the functionality described herein. As such, reference to a particular graphical presentation or shape of the navigation system 10 in the examples described shall not be construed as limiting.

The function of the navigation system 10 is to provide a simple and consistent interface for navigating through a dynamic collection of information. Dynamic collections of information can include, for example, computer file systems, databases, and of course, web sites. At the granular level, a dynamic collection of information may comprise a number of files, records, or web pages. Additionally, a dynamic collection of information may include files and records and web pages.

Furthermore, dynamic collections of information also comprise an inherent architecture. One particularly important aspect of a dynamic collection of information is that the information in the collection can be modified while it is being used, reviewed, searched, or otherwise accessed. For example, files in a file system can be added, removed, or modified. Similarly, records in a database can be added, removed, or modified and web pages can be added, removed, or modified. These changes to a dynamic collection of information can take place contemporaneously while a user is navigating the collection of information.

Figure 2:
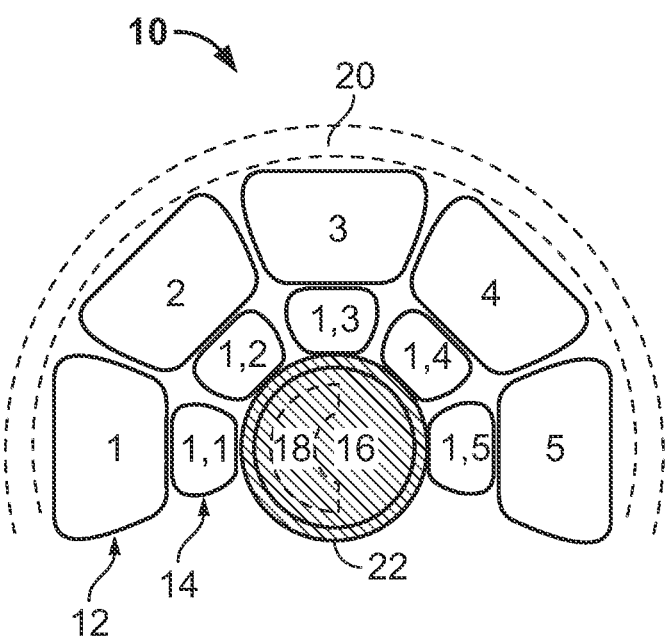
FIG. 2 is a block diagram illustrating an alternative system for navigating a dynamic collection of information according to an embodiment of the present invention.

FIG. 2 is a block diagram illustrating an alternative navigation system 10 for navigating a dynamic collection of information according to an embodiment of the present invention. The illustrated navigation system 10 comprises a top-level 12, a sub-level 14, an inner core 16 and an optional inner core element 18. The navigation system 10 also comprises a text display area 20 and a graphics display area 22, which is emphasized with shading.

The top-level 12 comprises a variable number of top-level elements, illustrated as elements 1-5 respectively. The sub-level 14 similarly comprises a variable number of sub-level elements, illustrated as elements 1,1-1,5 respectively. The elements of sub-level 14 are context sensitive and are instantiated in the navigation system according to which element (1-5) of top-level 12 is currently selected or otherwise in focus.

The text display area 20 arcs around the perimeter of the top-level 12 to provide a maximized linear distance in which to put textual information. Advantageously, an element that is currently selected or that currently has the focus of the navigation system 10 can be described with words in text display area 20. For example an element within the top-level 12, and element within the sub-level 14, the core-level 16, or the optional core-level element 18 may have the focus at any given time.

The text that is presented in text display area 20 may be presented in a variety of ways such as scrolling in from right to left or scrolling in from left to right. Various alternative ways to present and sustain the text in text display area 20 will be readily apparent to those skilled in the art.

The graphics display area 22 is centrally positioned within the navigation system 10 to provide a maximized contiguous area for the display of graphical images or video. In the illustrated embodiment, graphics display area 22 is disposed behind the core-level 16 and the optional core element 18. Alternatively, the core-level 16 and the optional core element 18 may be moved to another location in order to provide an unobstructed view of the graphics display area 22.

The graphics that are presented in graphics display area 22 may be presented in a variety of ways. For example, the graphics may be presented as moving video or as static images. Static images may be constant or they can be cycled such that a series of related images are shown that convey a particular meaning. The function served by displaying text, graphics, or both is to provide an understanding of the content available within the element of the navigation system 10 that is currently selected, or otherwise in focus. Various alternative ways to present and sustain the graphics in graphics display area 22 will be readily apparent to those skilled in the art.

Navigation system 10 may also comprise a speaker (not shown) that allows audio to be provided in addition to the text and graphics in order to increase the understanding of the available content.

Figure 3:
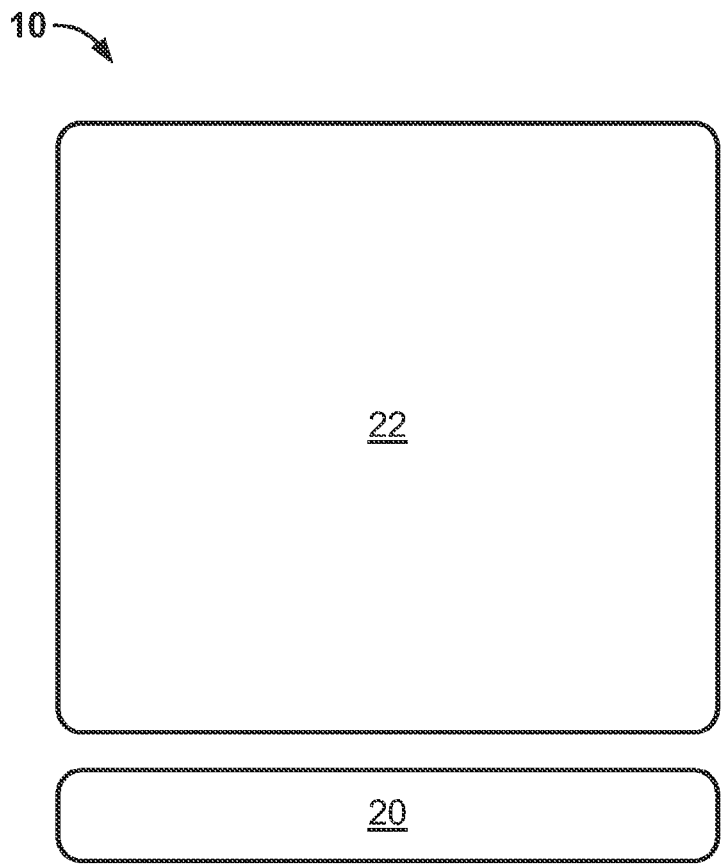
FIG. 3 is a block diagram illustrating another alternative system for navigating a dynamic collection of information according to an embodiment of the present invention.
Figure 3:
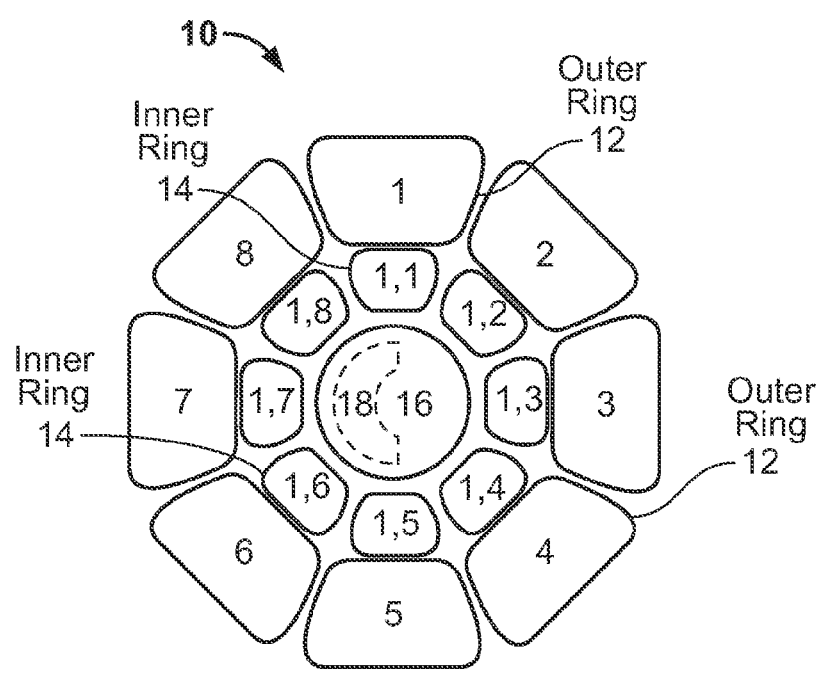

FIG. 3 is a block diagram illustrating another alternative navigation system 10 for navigating a dynamic collection of information according to an embodiment of the present invention. The navigation system 10 comprises an outer ring 12 and an inner ring 14 as previously described with respect to FIG. 1. Navigation system 10 additionally comprises an inner core 16 and an optional inner core element 18. Furthermore, navigation system 10 comprises a text display area 20 and a graphics display area 22, which is emphasized with shading.

The text display area 20 is disposed above the outer ring 12 to provide a viewable area for textual descriptions of the element that is currently selected. The graphics area 22 is disposed above the text display area 20 to provide a larger viewing area for graphics (images, video, or both) associated with the element that is currently selected. As previously described, the text display area 20 and the graphics display area 22 provide information and clues pertaining to the content that is available within the currently selected or otherwise in focus element of the outer ring 12, inner ring 14, inner core 16, or optional inner core element 18.

Advantageously, the organization of the navigation system 10 as illustrated provides a larger, more conspicuous graphical display area 22. Such an organization may increase the ability of the graphics display area 22 to provide meaningful information related to the available content.

FIG. 4 is a block diagram illustrating a table 30 of dynamic content listings according to an embodiment of the present invention. The dynamic content listings in table 30 correspond to the previously described elements of top-level 12 and elements of sub-level 14. For example, the top row of table 30 corresponds to the elements (1-5) of the top-level 12 as described with respect to FIG. 2. The first column of table 30 (excluding the top row element) corresponds to the elements (1,1-1,5) of the sub-level 14 also described with respect to FIG. 2. The additional columns 2-5 correspond to the elements of each respective sub-level present in the dynamic collection of information. Advantageously, the dynamical collection of information can be examined and the resulting relationships stored in table 30.

As indicated by the ellipses extending out from the top row representing the top-level 12 and extending down from each column representing the various sub-levels 14, the number of entries in the top-level 12 (and therefore the number of entries in the top row of table 30) and the number of entries in each sub-level 14 (and therefore the number of entries in each column of table 30) can vary. The respective number of entries varies based on the hierarchical structure inherent in the dynamic collection of information that is being navigated by the navigation system 10.

FIGS. 5A-5E are block diagrams illustrating the various states of a navigation system 10 in conjunction with the table of dynamic content listings shown in FIG. 4. In FIGS. 5A-5E, those elements that are currently selected or otherwise in focus are emphasized with shading, along with the graphics display area 22. Initially, in FIG. 5A, element 1 of top-level 12 is selected. The selection of an element may be carried out in a variety of ways, for example with a mouse-over event or a mouse click on a computer system. Additionally, an element may be selected by use of an input device such as a wand on a personal digital assistant device. Alternatively, an element may be selected by use of a voice command in conjunction with a voice recognition system.

In the navigation system 10, the selection of element 1 of top-level 12 dynamically causes the elements of sub-level 14 to be instantiated with the corresponding elements from table 30. For example, in the illustrated embodiment, element 1 of top-level 12 has five sub-elements (1,1-1,5) respectively. These five sub-elements are instantiated into the elements of sub-level 14 once element 1 of top-level 12 is selected.

Additionally, the selection of element 1 of top-level 12 causes any description in text display area 20, any graphics in graphics display area 22, and any associated audio to be updated according to the content associated with the new selection.

Figure 5A:
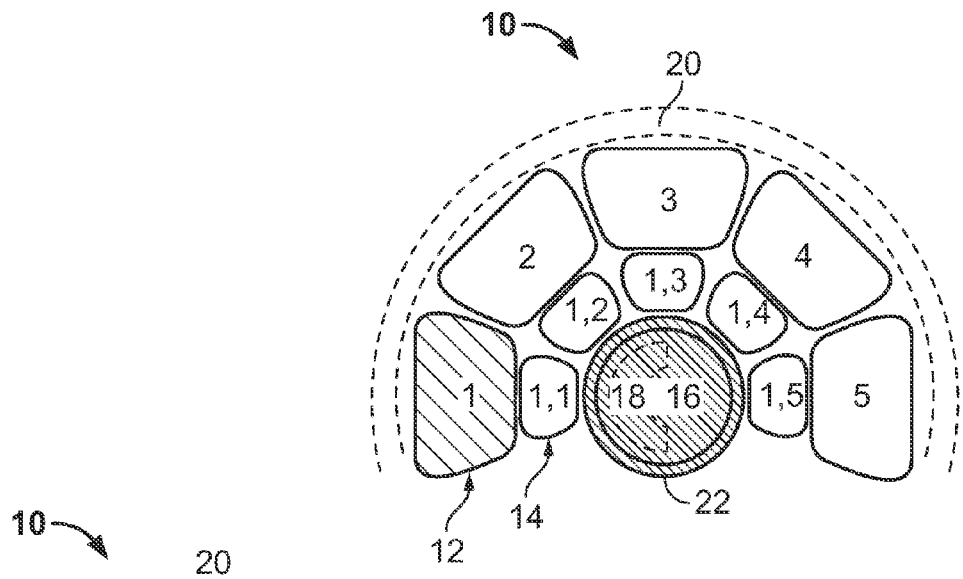
FIGS. 5A-5E are block diagrams illustrating the various states of a navigation system in conjunction with the table of dynamic content listings shown in FIG. 4.
Figure 5B:
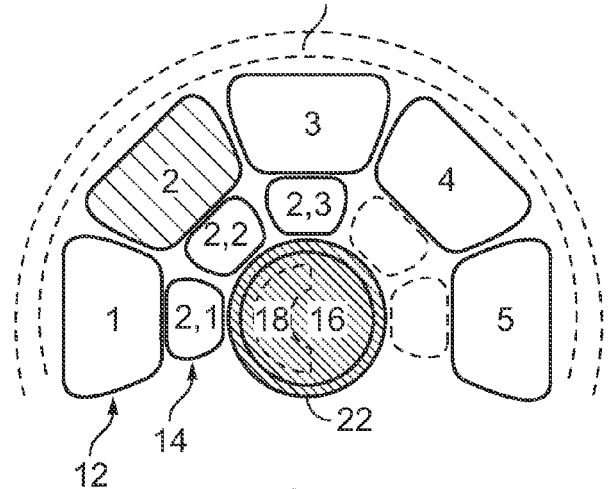

Turning to FIG. 5B, selected element 2 of top-level 12 has three sub-elements (2,1-2,3) respectively, as also shown in FIG. 4. These three sub-elements are instantiated into the elements of sub-level 14 once element 2 of top-level 12 is selected.

Figure 5C:
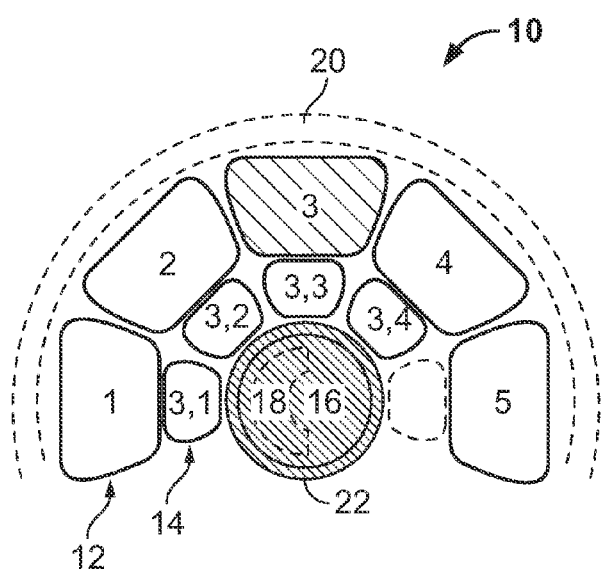

Similarly, with respect to FIG. 5C, selected element 3 of top-level 12 has four sub-elements (3,1-3,4) respectively, as also shown in FIG. 4. These four sub-elements are instantiated into the elements of sub-level 14 once element 3 of top-level 12 is selected. Also illustrated in FIGS. 5B and 5C are potential additional elements of sub-level 14. Although the illustrated embodiments show a total of only five elements of sub-level 14, there can be any number of additional or fewer elements. For example, additional elements can be added to sub-level 14 by decreasing the size of each element contained within sub-level 14.

Figure 5D:
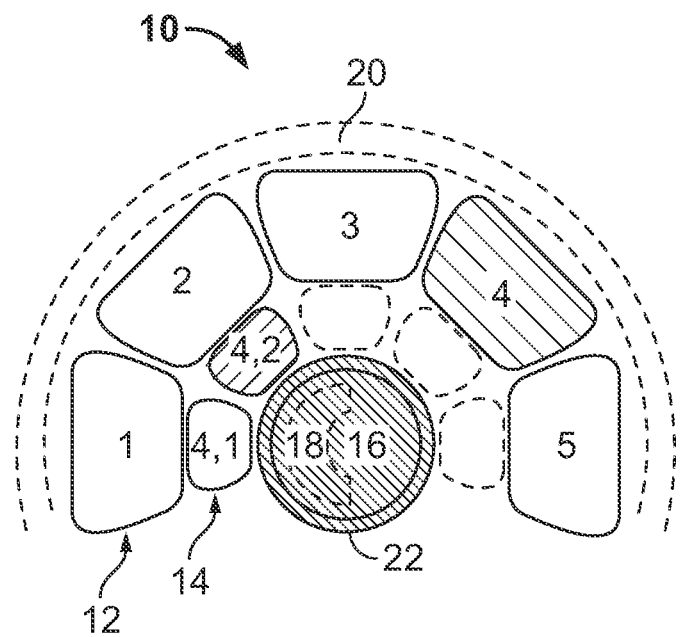

In FIG. 5D, selected element 4 of top-level 12 has two sub-elements (4,1-4,2) respectively, as also shown in FIG. 4. These two sub-elements are instantiated into the elements of sub-level 14 once element 4 of top-level 12 is selected. Additionally, in the illustrated embodiment, element 4,2 of sub-level 14 is selected. Advantageously, selection of this element of sub-level 14 causes any description in text display area 20, any graphics in graphics display area 22, and any associated audio to be updated according to the new selection.

Figure 5E:
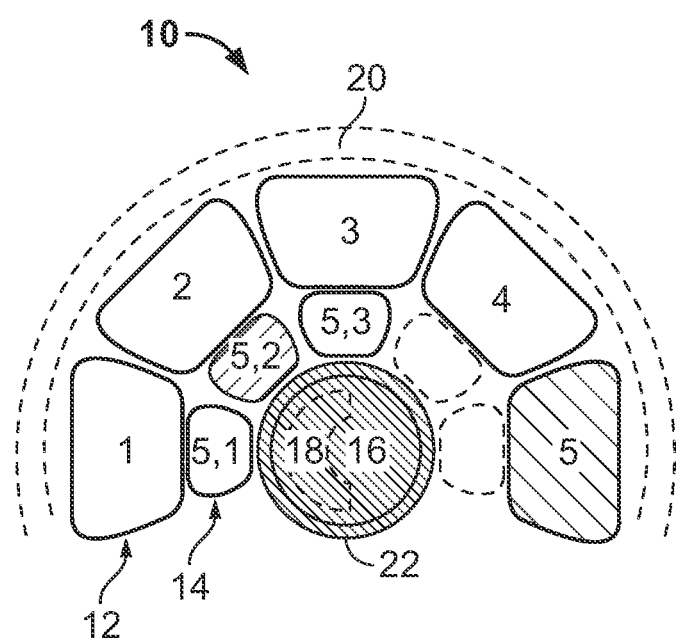

Similarly, in FIG. 5E, selected element 5 of top-level 12 has three sub-elements (5,1-5,3) respectively, as also shown in FIG. 4. These three sub-elements are instantiated into the elements of sub-level 14 once element 5 of top-level 12 is selected. Additionally, in the illustrated embodiment, element 5,2 of sub-level 14 is selected. Advantageously, selection of this element of sub-level 14 causes any description in text display area 20, any graphics in graphics display area 22, and any associated audio to be updated according to the new selection.

Figure 6:
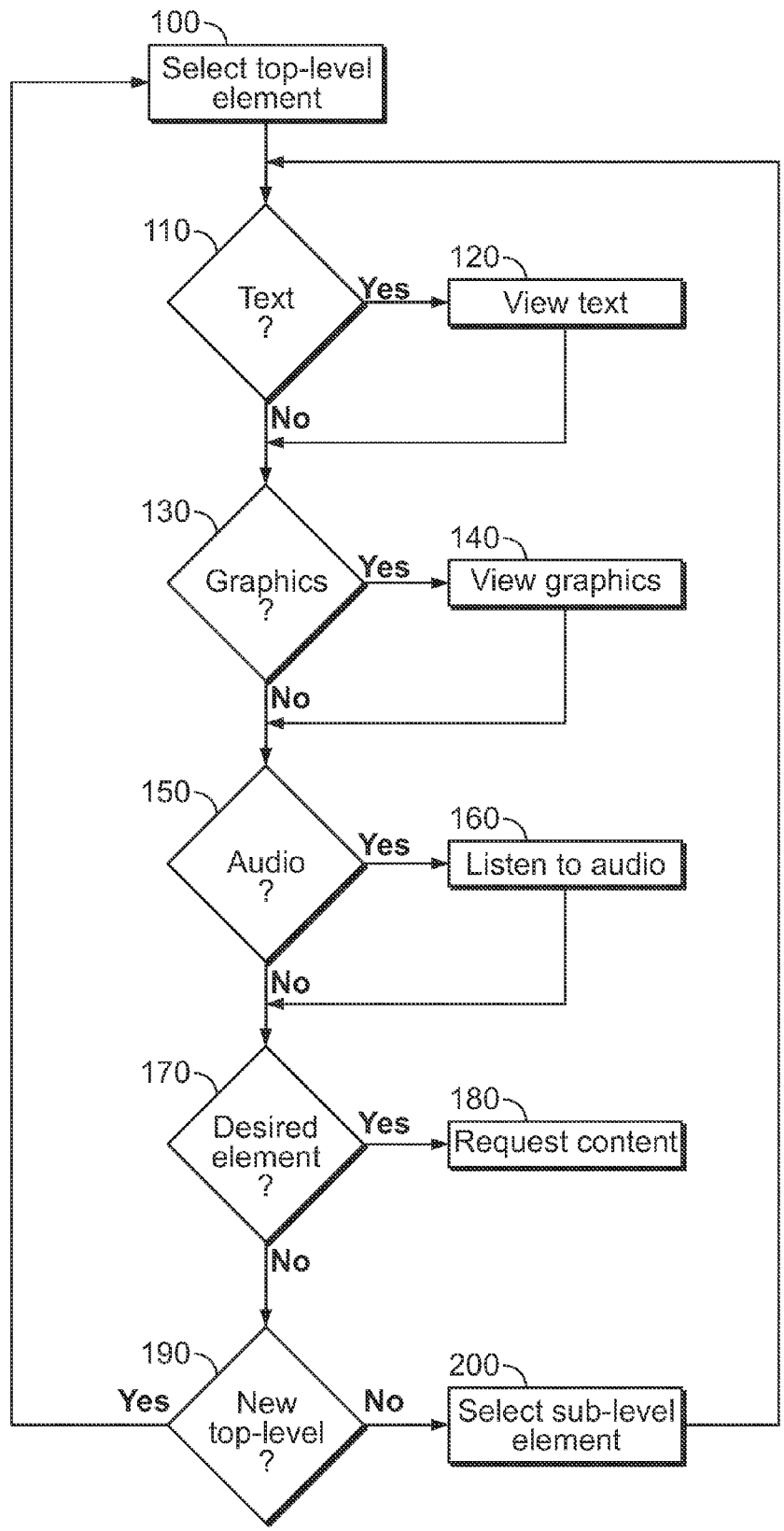
FIG. 6 is a flow diagram illustrating an example user process for navigating a dynamic collection of information according to an embodiment of the present invention.

FIG. 6 is a flow diagram illustrating an example user process for navigating a dynamic collection of information according to an embodiment of the present invention. Initially, a user selects a top level element presented in the navigation system, as shown in step 100. The selection of an element in the navigation system may be carried out by a variety of means, including a mouse-over event, a mouse click event, depressing a button on a keypad, touching the appropriate area on a touch screen interface device, speaking an oral command (in conjunction with a speech recognition system), or by the use of a wand device (e.g., with a PDA), just to name a few.

Once the user has selected a top-level element, the navigation system updates to convey to the user the content available within the selected element. If there is new text associated with the selection, as illustrated in step 110, the user views that text in the text display area, as shown in step 120. The text may be presented in a scrolling, flashing, or otherwise conspicuous manner to grab the attention of the user.

If there are new graphics associated with the selection, as illustrated in step 130, the user views the new graphics in the graphics display area, as shown in step 140. The graphics may be presented as static images or as moving video. Additionally, a single static image may be presented or a group of static images may be presented in sequence such that the images are cycled on a periodic basis (with variable or even display times). Advantageously, moving video or cycling through a series of static images effectively catches the attention of the user.

In addition to text and graphics, if there is audio associated with the selection, as illustrated in step 150, the user listens to the audio from speakers that are coupled with the navigation system, as shown in step 160. The audio may be presented as a brief sound byte, or as a continuous, possibly looping stream of audio. In one embodiment, the audio may emphasize the text being displayed by speaking the words that are displayed in the text area. Alternatively, the audio may emphasize the graphics being displayed in the graphics display area by serving as a sound track for moving video or cycling static images. Additionally, the audio may complement both the text and the graphics.

Advantageously, text, graphics, and audio can be combined and choreographed to work in concert and efficiently convey to the user what content is available within the selected element.

Once the navigation system has been updated and the user has viewed the new text and graphics and listened to any new audio, the user makes a determination whether the desired element has been selected, as illustrated in step 170. If the desired element has been selected, the user then requests the content, as shown in step 180. Requesting the content associated with an element may be carried out by various means, including a mouse-click event (or double-click), depressing a button on a keypad, touching the appropriate area on a touch screen interface device, speaking an oral command (in conjunction with a speech recognition system), or by the use of a wand device (e.g., with a PDA), just to name a few. The content itself may be a file, a directory, a database record, or a web page.

If the desired element has not been selected, referring back to step 170, the user determines whether a new top level element is desired, as shown in step 190. If a new top-level element is desired, the process loops back and the user begins anew and selects another top level element, as illustrated in step 100. If the user is satisfied with the top-level element, but the desired element has not been found, then the user selects a sub-level element, as shown in step 200. Advantageously, sub-level elements can refine the content associated with a top-level element in order to allow the user to narrow the scope of the content prior to making a request for the content.

One particular advantage of this approach is to reduce the bandwidth required when a user navigates through a large collection of information. For example, in a wireless networking environment, where bandwidth is at a premium, the inventive navigation system is much more desirable for both users and network providers.

Once the user has selected a sub-level element, referring back to step 200, the process loops back to step 110 and begins again by providing any new text, graphics, and audio associated with the newly selected element.

Figure 7:
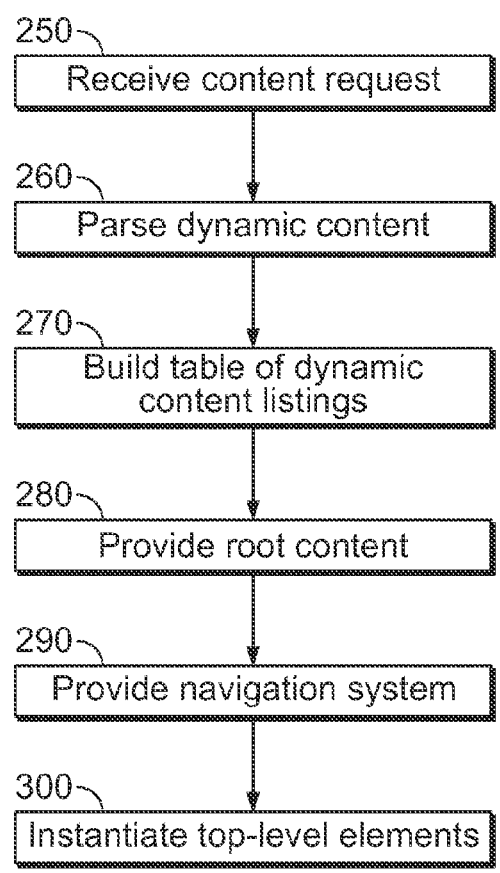
FIG. 7 is a flow diagram illustrating an example process for initializing a navigation wheel according to an embodiment of the present invention.

FIG. 7 is a flow diagram illustrating an example information server process for initializing a navigation wheel according to an embodiment of the present invention. First, in step 250, the server receives an initial content request. This initial content request may be a request for a file, a request for a database record, or a request for a web page. Upon receiving the initial request, the server examines the dynamic collection of information to determine its hierarchical structure. For example, the server may parse the dynamic collection of information, as shown in step 260. The server then builds a table of dynamic content listings, as illustrated in step 270.

The table (previously described with respect to FIG. 4) preferably reflects the hierarchical structure of the dynamic collection of information. For example, the table may be, in one representation, viewed as a tree structure. However, for ease of description, the hierarchical representation of the collection of information will be referred to herein as a table. Once the table has been constructed, the server provides the root content to the requesting user, as illustrated in step 280. The root content may comprise the main page of a web site, the root level (or desktop) view of a file system, or the top level view of a database. Alternatively, the root content may be provided immediately after receiving the content request. Additionally, the step of providing the root content may be carried out contemporaneously with the steps of parsing the dynamic content and building the table of dynamic content listings.

After providing the root content to the requesting user, the server next provides the navigation system, as shown in step 290. The navigation system, similar to the root content, is presented to the user once it has been provided. In one embodiment, the navigation system may be presented as an overlay on the viewing device (e.g. monitor, PDA screen) in use. The overlay may be resident in a particular application window, for example when the navigation system is being used with a database application or a web browser. Alternatively, the overlay may be resident on the computer desktop when the navigation system is being used with a file system.

Advantageously, when the navigation system is being used with an application, the presentation of the navigation system can be implemented as an overlay such that the content within the application window can be viewed beneath the navigation system. Furthermore, when the underlying application window is scrolled, the navigation system preferably remains fixed within the application window, floating above the content within the application window.

Once the navigation system has been provided, the server instantiates the top-level elements, as shown in step 300. Referring back to FIG. 4, the top-level elements are those elements that are in the top row of the dynamic content table. For example, the top-level elements can be the links from the main page of a web site or the available disk drives on a computer system. These top-level content elements are instantiated into the navigation system so that a top-level element can be selected by the user. At this point, the server may also provide any text, graphics, or audio to be associated with the base navigation system.

Figure 8:
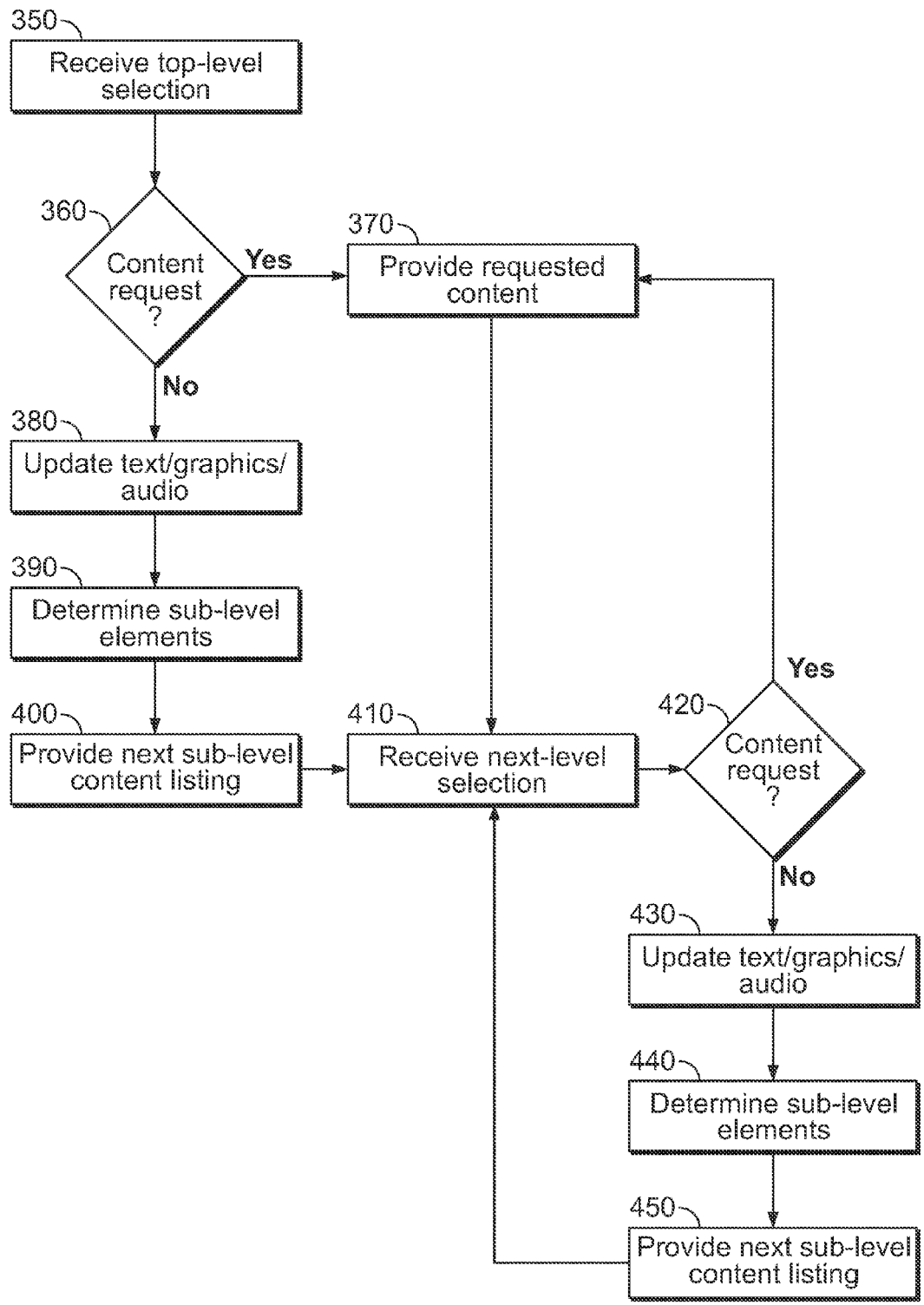
FIG. 8 is a flow diagram illustrating an example server process for navigating a dynamic collection of information according to an embodiment of the present invention.

FIG. 8 is a flow diagram illustrating an example server process for navigating a dynamic collection of information according to an embodiment of the present invention. Initially, the server receives a top-level selection from the user, as illustrated in step 350. The selection may be received via conventional inter-process communication ("IPC") in an embodiment where the navigation system is resident on a single device. Alternatively, the selection may be received via a network communication in an embodiment where the navigation system resides on a centralized server.

Once the server receives the selection, it examines the selection to determine if a top-level element has been selected or if top-level content has been selected, as shown in step 360. If the request is for top-level content, the content is provided, as shown in step 370. The content may comprise a file, a database record, a web page, or some combination of these and other types of content. Once the requested content has been provided, the server waits to receive the next-level selection, as shown in step 410.

If the request is a selection of a top-level element, the server next provides any new text, graphics, or audio that is associated with the newly selected element, as illustrated in step 380. Additionally, the server determines what sub-level elements are associated with the selected top-level element and instantiates those sub-level elements into the navigation system, as shown in steps 390 and 400.

Once the text, graphics, audio, and sub-level elements have been provided to and instantiated in the navigation system, the server waits until it receives the next-level selection, as illustrated in step 410. The next-level may be another top-level selection or it may be a sub-level selection. Additionally, the next-level selection may be a content request or a selection of an element in the next-level (i.e., top-level or sub-level). The server examines the request to determine the type of request, as shown in step 420. If the request is a content request, the server provides the requested content, as shown in step 370. Once the requested content has been provided, the server waits to receive the next-level selection, as shown in step 410.

If the request is a selection of a next-level element, the server then provides any new text, graphics, or audio that is associated with the newly selected element, as illustrated in step 430. Additionally, the server determines what sub-level elements are associated with the selected next-level element and instantiates those sub-level elements into the navigation system, as shown in steps 440 and 450. Once the text, graphics, audio, and sub-level elements have been provided to and instantiated in the navigation system, the process loops back and the server waits until it receives the next-level selection, as shown in step 410.

Figure 9A:
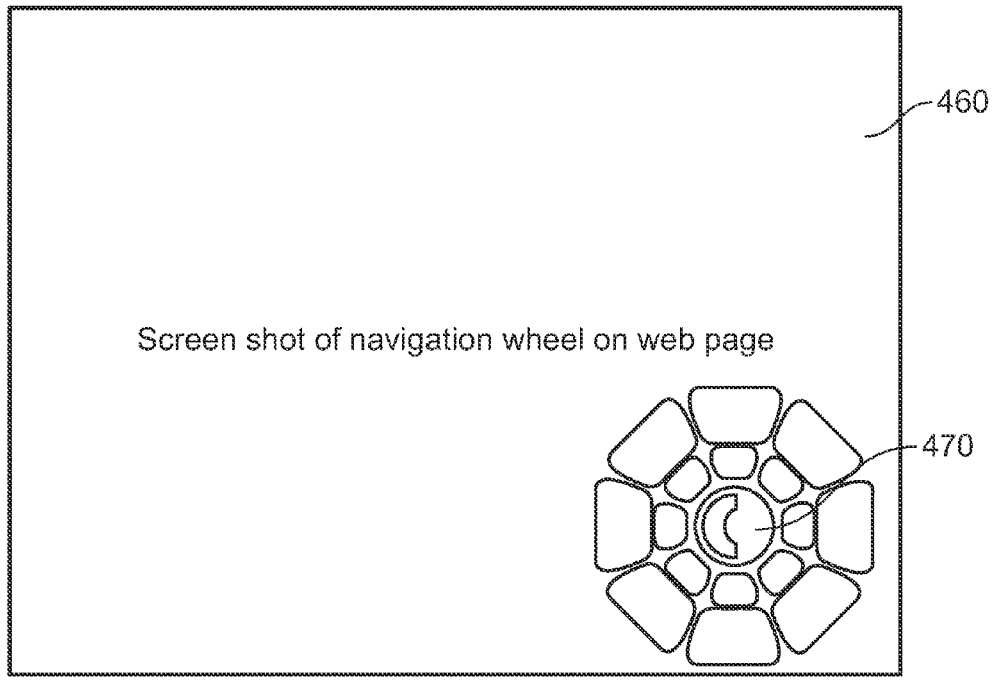
FIG. 9A is a screen shot illustrating an example application window incorporating a navigation wheel according to an embodiment of the present invention.

FIG. 9A is a screen shot illustrating an example application window 460 incorporating a navigation wheel 470 according to an embodiment of the present invention. In the illustrated embodiment, a web browser application window 460 is shown. The navigation wheel 470 is placed at the lower right hand corner of the application window 460, superimposed over the content in the application window 460. Preferably, as the content in the application window 460 is scrolled up and down, the navigation wheel 470 remains fixed in the lower right hand corner, effectively floating over the scrolling content in the application window 460. The location of the navigation wheel 470 in the application window 460 can vary. For example, the navigation wheel 470 may be placed in the upper or lower portion of the window 460 or in the right hand or left hand portion of the window 460.

Figure 9B:
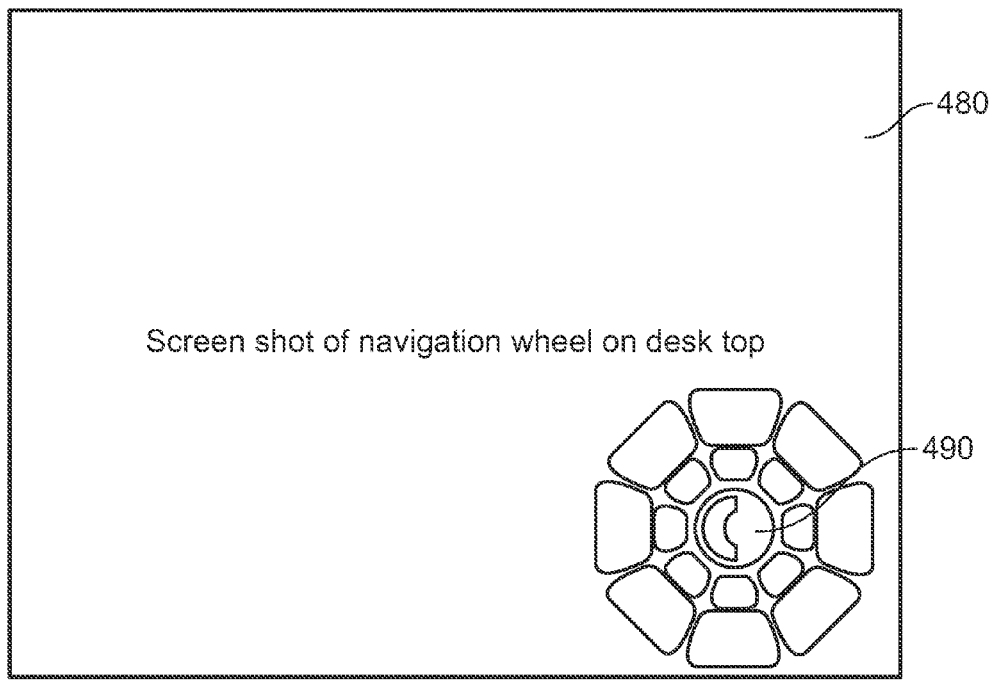
FIG. 9B is a screen shot illustrating an example computer desktop incorporating a navigation wheel according to an embodiment of the present invention.

FIG. 9B is a screen shot illustrating an example computer desktop 480 incorporating a navigation wheel 490 according to an embodiment of the present invention. In the illustrated embodiment, a the computer desktop 460 is shown as a computer running the Microsoft® Windows® operating system. Alternative operating systems such as MacOS®, Linux, UNIX, or others may also be the underlying engine for the computer desktop 480.

The navigation wheel 490 is placed at the lower right hand corner of the computer desktop 480, superimposed over any application windows on the desktop 480. Preferably, as application windows on the computer desktop 480 appear, disappear, and move around the desktop 480, the navigation wheel 490 remains fixed in the lower right hand corner, effectively floating over any application windows on the desktop 480. The location of the navigation wheel 490 on the computer desktop 480 can vary. For example, the navigation wheel 490 may be placed in the upper or lower portion of the computer desktop 480 or in the right hand or left hand portion of the computer desktop 480.

Figure 10:
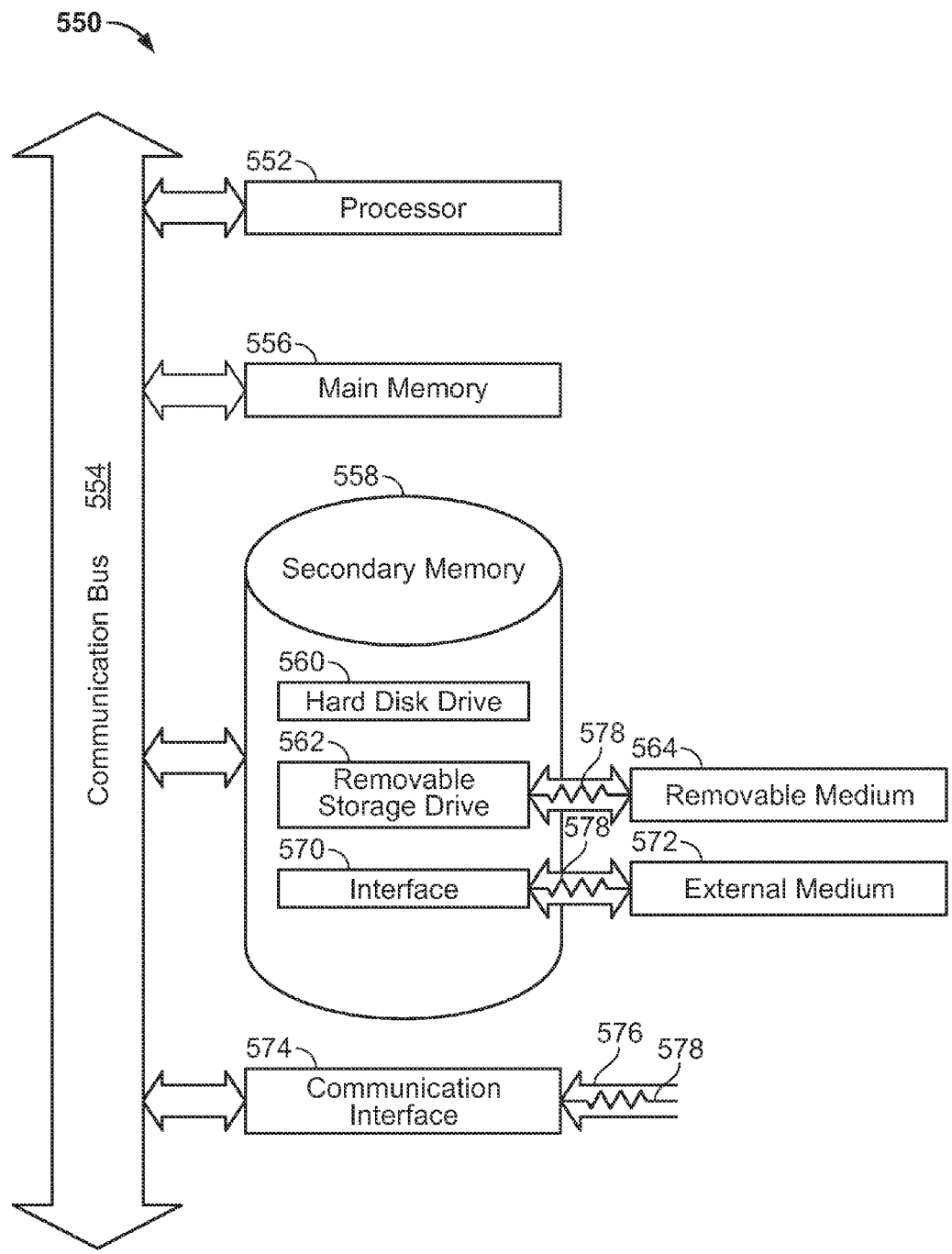
FIG. 10 is a block diagram illustrating an exemplary computer system as may be used in connection with various embodiments described herein.

FIG. 10 is a block diagram illustrating an exemplary computer system 550 that may be used in connection with the various embodiments described herein. For example, the computer system 550 may be used in conjunction with a conventional personal computer ("PC"), notebook computer, laptop computer, personal digital assistant ("PDA"), network terminal, database terminal, automatic teller machine ("ATM"), wireless communication device, and the like. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The retain memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external bard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an iEEE 1394 fire-wire, just to name a few.

Communication interface 574 preferably implements industry promulgated protocol standards, such as Ethernet IEEE 802 standards, Fibre Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) are stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Other new embodiments of this application are described.

Figure 11:
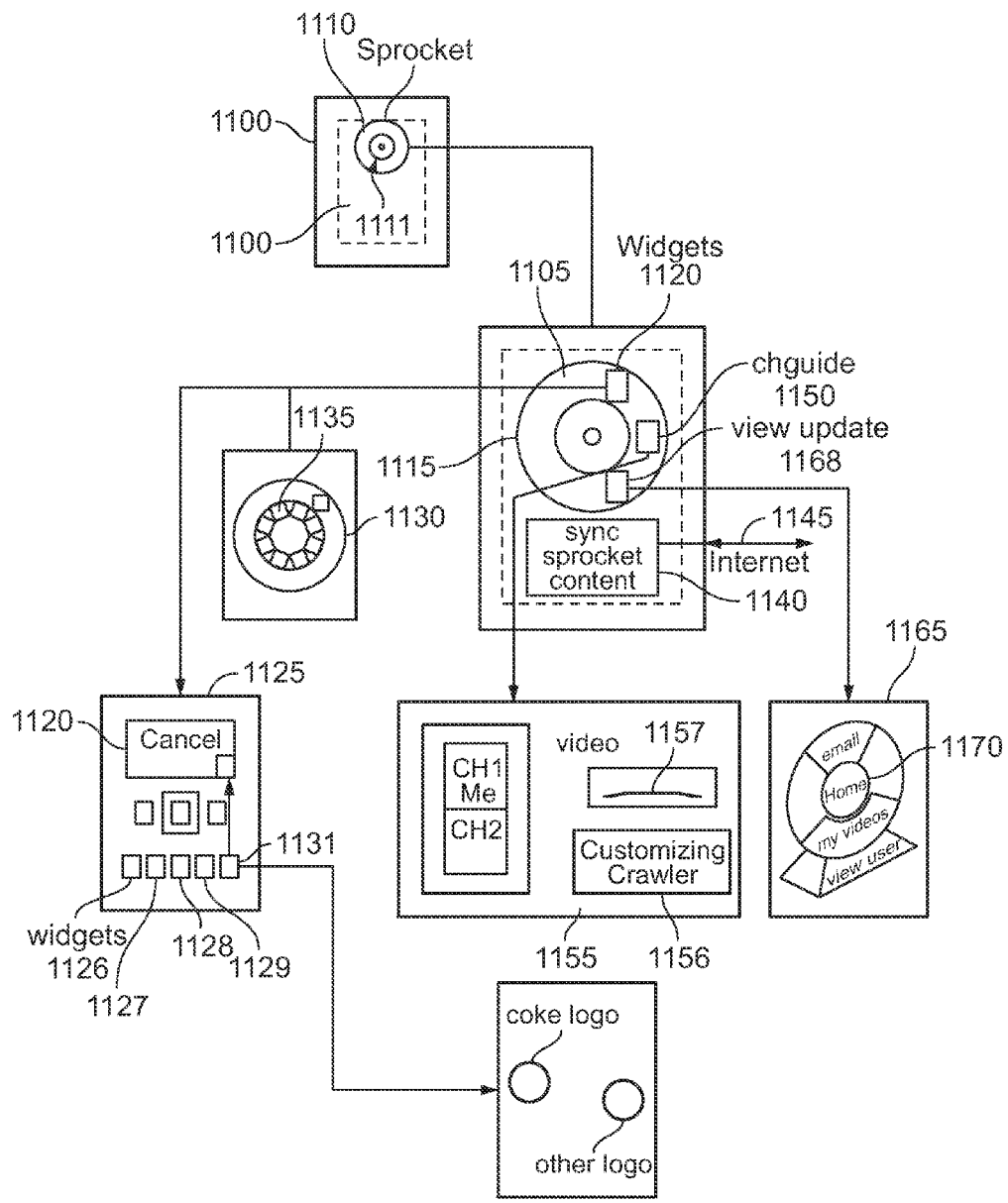
FIG. 11 illustrates the interaction between the embodiments and different operations which can be taken.

FIG. 11 illustrates an additional embodiment of how the sprocket style user interface described in previous embodiments can be modified to be used on a mobile phone screen. FIG. 11 shows the mobile phone 1100 and its screen 1105 showing the sprocket interface 1110 thereon. Different areas on the sprocket can be selected as in the previous embodiments. First, just selecting, e.g., touching a touchscreen sprocket shown as 1111 causes the sprocket to increase in size on the user's screen 1105, thereby showing an enlarged sprocket 1115.

The outer ring of the sprocket may include a number of different things that can be done on the portable phone. For example, 1120 may be a page of widgets, which when selected causes the mobile phone to display the screen 1125. These widgets can be for example flat widgets. As an alternative, clicking the widgets 1120 cause the sprocket to display 1130, showing widgets such as 1135 in its middle ring. The widgets, as well as all of the other content used on the sprocket can be stored in the phone in memory 1140, which is periodically synchronized to the Internet. In one embodiment, sync may occur each time that a sprocket button is selected. In one embodiment, the sync when touch is set not to occur more than once every 15 minutes. This provides dynamic synchronization, thereby ensuring that a user obtains the most up-to-date version of the user interface each time that the user interface is used.

In the embodiment, the different widgets can have different functions. Widget 1126, for example can be a social network widget. Widget 1127, for example can itself be another channel guide besides the channel guides described herein or can be the same channel guide described herein. Widget 1128 can be a studio allowing the user to carry out various studio functions on their phone. Widget 1129 can be a media library. Widget 1131 can be a favorite selecting widget, that allows selecting displaying your favorite items. In one embodiment, the selection of favorite items may include selecting favorite advertisers, to create a relationship with those advertisers.

Other items in the menu may include a widget or link that interfaces with the lifestyle portal, as described in our U.S. Pat. No. 7,590,556, the entire contents of which are herewith incorporated by reference. Another item in the menu or its contents may include immersive advertising of the type described in U.S. Pat. No. 7,464,344, the entire contents of which are herewith incorporated by reference.

Selecting any widget or item such as 1131 causes the widget itself to be launched shown as 1132. In this sense, the minimized widgets such as 1131 are breadcrumbs for the main widget 1132.

In other embodiments, the widgets/breadcrumbs can be channels, clips, favorites or other kinds of content.

An important feature of the channel guide as used herein is that websites can be controlled from the computer that runs the menu—e.g., here an Iphone or other smartphone. This allows users to use the Internet in the same way that they use their TV. By operating in this way, this forms a convergence between the Internet and television. The Internet can be controlled with the mouse as conventional, or can be controlled using a mobile phone as the remote control to select items in the internet channel guide. In the latter embodiment, the mobile phone can be used to control the Internet content, and can also produce output signals which control displaying that Internet content on the television or the like.

According to an embodiment, the user can select what that they would prefer to see. This can be done, for example, via the "my favorites" widget 1131. FIG. 11 shows a list of logos for different advertisers. The user can select one or more of the different logos to view an advertisement. After selecting the logo, it creates a relationship, putting the user's video on their home page, providing special offers, and providing the user with sponsor content.

Another sprocket control is the channel guide 1150 which may cause the screen shown in 1155 which shows a guide of channels that can be seen on a mobile phone screen. As an alternative, this can also show mobile phone channels on the inner ring of the sprocket. According to another embodiment, the channels can be both public channels such as CBS and NBC, premium channels such as HBO, and can also be custom channels, created by a customizing crawler 1156. The customizing crawler can allow users to enter criteria shown as 1157 that they want to find in the channel. For example, a user might enter "Clint Eastwood" to attempt to find different things related to Clint Eastwood. This can include URLs, TV channels, and the like, all of which are related to Clint Eastwood.

A view user data control at 1160 can cause the sprocket to attain the state shown in 1165, where the mid-ring shows the different user pages associated with the user. When used as a navigation keys, this can provide the user access to their own "my videos", as well as system selected videos that the system postulates that the user might be interested in e.g. based on their previous selections.

In one embodiment, the center 1170 of the sprocket is always a "home" piece, and from that piece one can always get to any other item with two different selections.

In an embodiment, the sprocket can be downloadable, and updates to the content addressed by the sprocket can also be downloadable. In this way, the user interface itself becomes download-capable.

The sprocket's expanded capabilities include the following.

Web/mobile channel and Mobile App guide and channel distribution both pushing channels out and pulling them in based on the consumer's customizable settings or intelligence learned about the consumer by the consumer use of the sprocket. Channels include content offered both through the World Wide Web and mobile devices, television, cable and pay per view and other providers such hulu and iTunes. The Channel device includes a music guide and channel distribution based on consumer criteria.

The Sprocket searches the device where the sprocket is being used and offers Applications ("app (s)") based on the type of platform the consumer is using. One embodiment may aggregate all known apps for any platform worldwide and provides on the web in a searchable directory.

Location based programming is supported. Consumers are able to search for local content based on their postal code or country and area code. This can be automatically detected by the mobile phone, using the mobile phones location detecting capability.

The selection of various parts may include any form of data entry, including, but not limited to, haptic technology, taking advantage of a user's sense of touch by applying forces, vibrations, and/or motions to the user. This mechanical stimulation may be used to assist in the creation of virtual objects (objects existing only in a computer simulation), for control of such virtual objects, and for the enhancement of the remote control of machines and devices. For example, this can use a "Tactile Touchpad" design with button functionality and haptic feedback incorporated into the tracking surface.

The system can bring together all the aspects of a user's digital life in an intuitive, easy to use and elegant interface. This can be part of a next generation multiplatform social media desktop for mobile devices and tablets.

Figure 12:
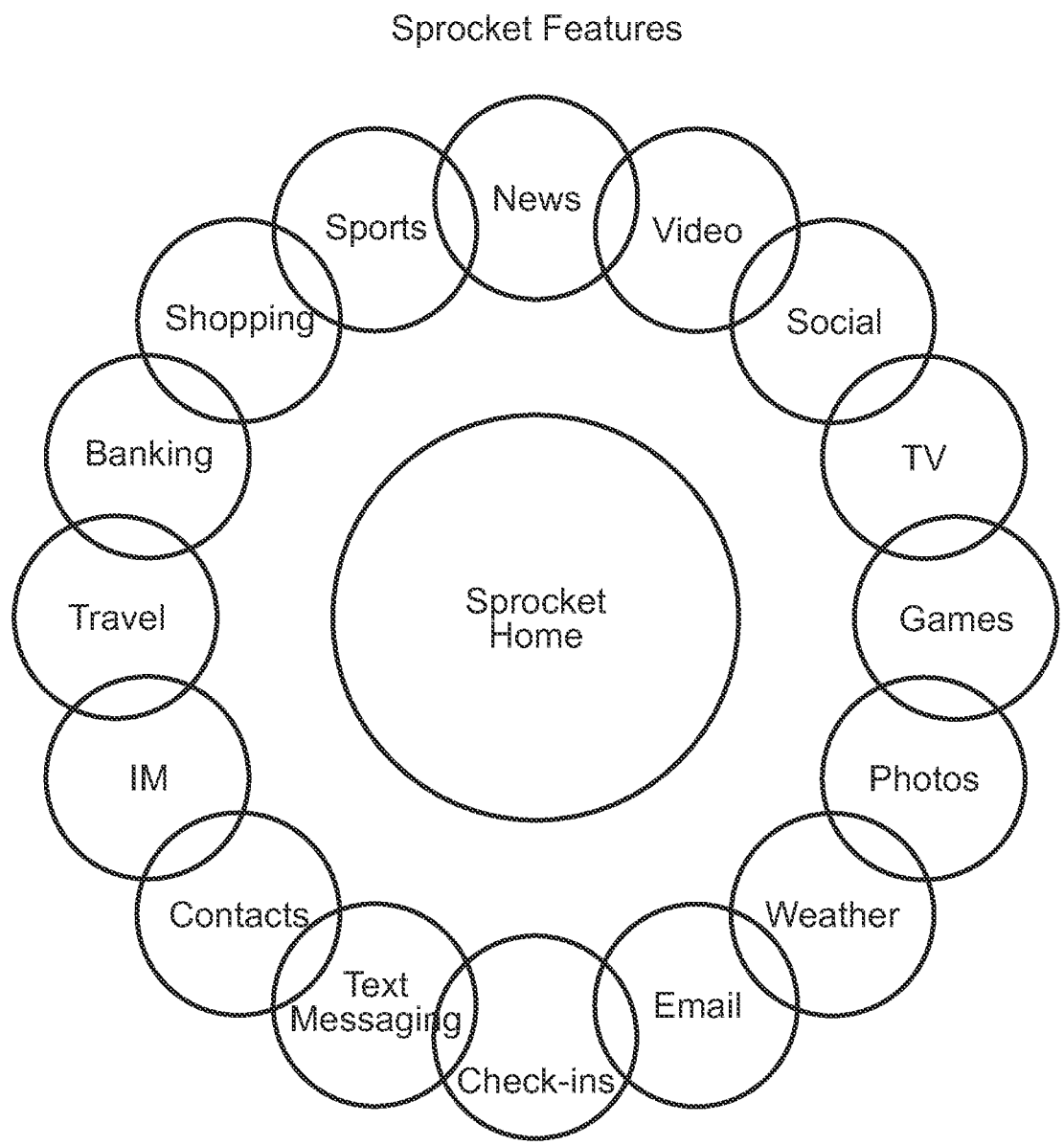
FIG. 12 shows the different operations that can be taken with the sprocket.

One specific application of the sprocket user interface that includes combining the channel guide along with the immersive advertising described above and the lifestyle portal described above, FIG. 12 shows a detailed layout of the improved sprocket as used for various functions. The different elements of the sprocket wheel as shown include news, video, social, television, games, photos, weather, e-mail, check ins, text messaging, contacts, instant messaging, travel, banking, shopping, and sports. This may be the expanded version of the sprocket, which is seen when the sprocket is enlarged as in 1115. The smaller version of the sprocket may include only some of these portions, for example only the ones of the portions that are most commonly used either by the user themselves or by anyone; or may include summary categories that are expanded to show the FIG. 12 categories.

Figure 13:
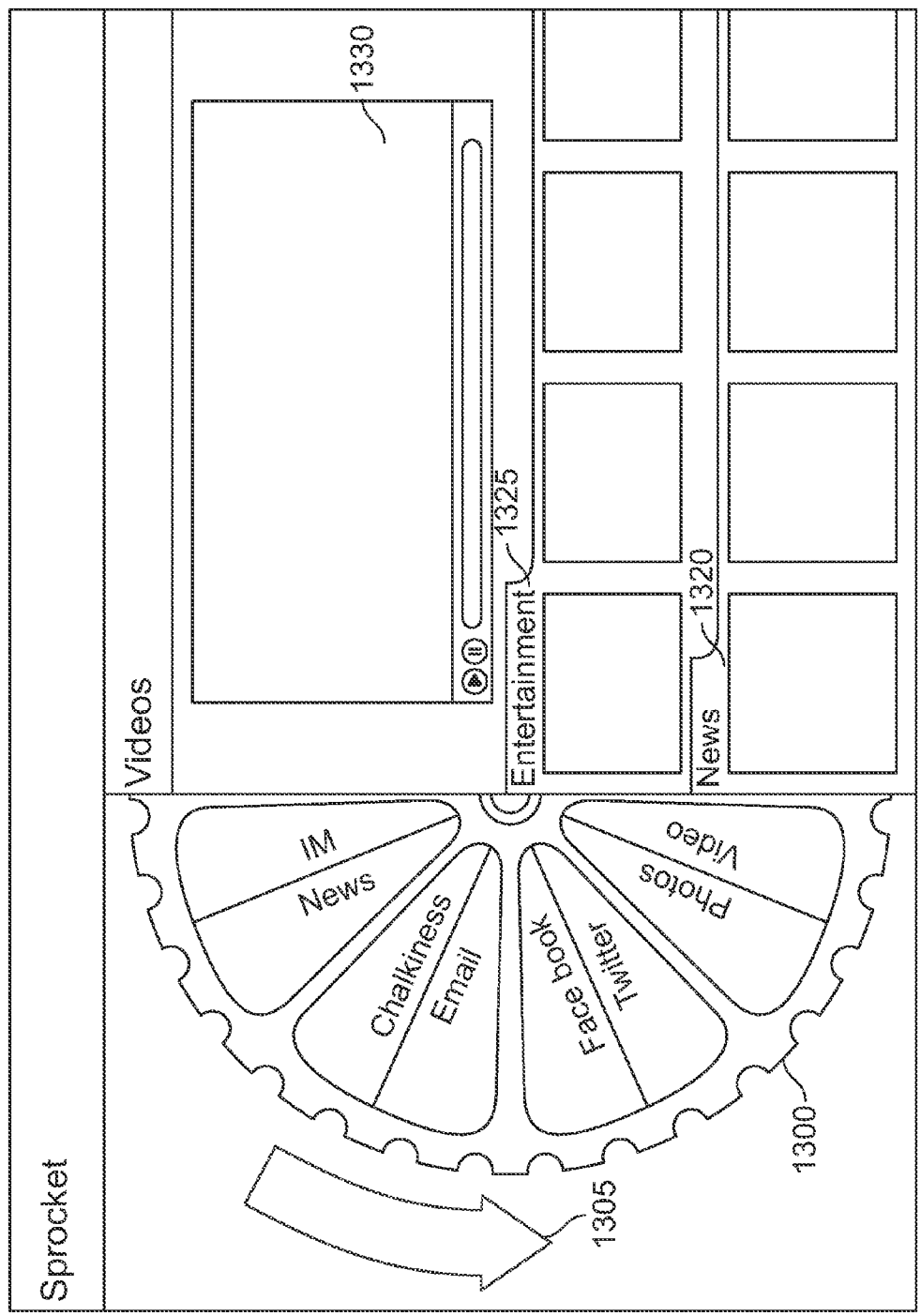
FIG. 13 shows other operations that can be taken, and shows how a half version view of the sprocket can be shown on the screen along with other user interface parts.

FIG. 13 illustrates another embodiment of the sprocket user interface, where the sprocket user interface itself 1300 is shaped to look like a sprocket, with different functions as shown. In the FIG. 13 embodiment, the sprocket forms only half the virtual wheel, which can be rotated as in 1305 to show other portions of the virtual wheel. As shown, this sprocket wheel 1300 includes instant message, news, checking, e-mail, social networks here Facebook and Twitter, photos and videos as well as the immersive advertising and lifestyle portal described above. This can be changed by updating the sprocket as noted above. Moreover, as the sprocket rotates, other features may be added to the sprocket. One advantage, for example, of the Sprocket is that more items can be fit into the sprocket than would be possible using a sprocket whose parts will be fully seen. For example, while the sprocket can be rotated, there can be four pages of sprocket, since the sprocket is not limited by the size of the complete circle.

The right side of the screen may show additional aspects associated with the navigation and selection. Here, there can be two tabs, shown as the news tab 1220 and the entertainment tab 1225. A video tab 1230 can also be shown. These tabs provide options in the category. For example, selecting the news portion of the sprocket may provide a news tab. Selecting Facebook or twitter from the sprocket may bring up the entertainment tab 1225, which may show Facebook and twitter type entertainment information, but may also show other entertainment. Swiping horizontally under each tab provides options in that category. Swiping vertically provides related video or other kinds of tips.

In the FIG. 13 embodiment, therefore, there is a "half sprocket" 1300, with previews, hints and content in the other half screen.

Figure 14:
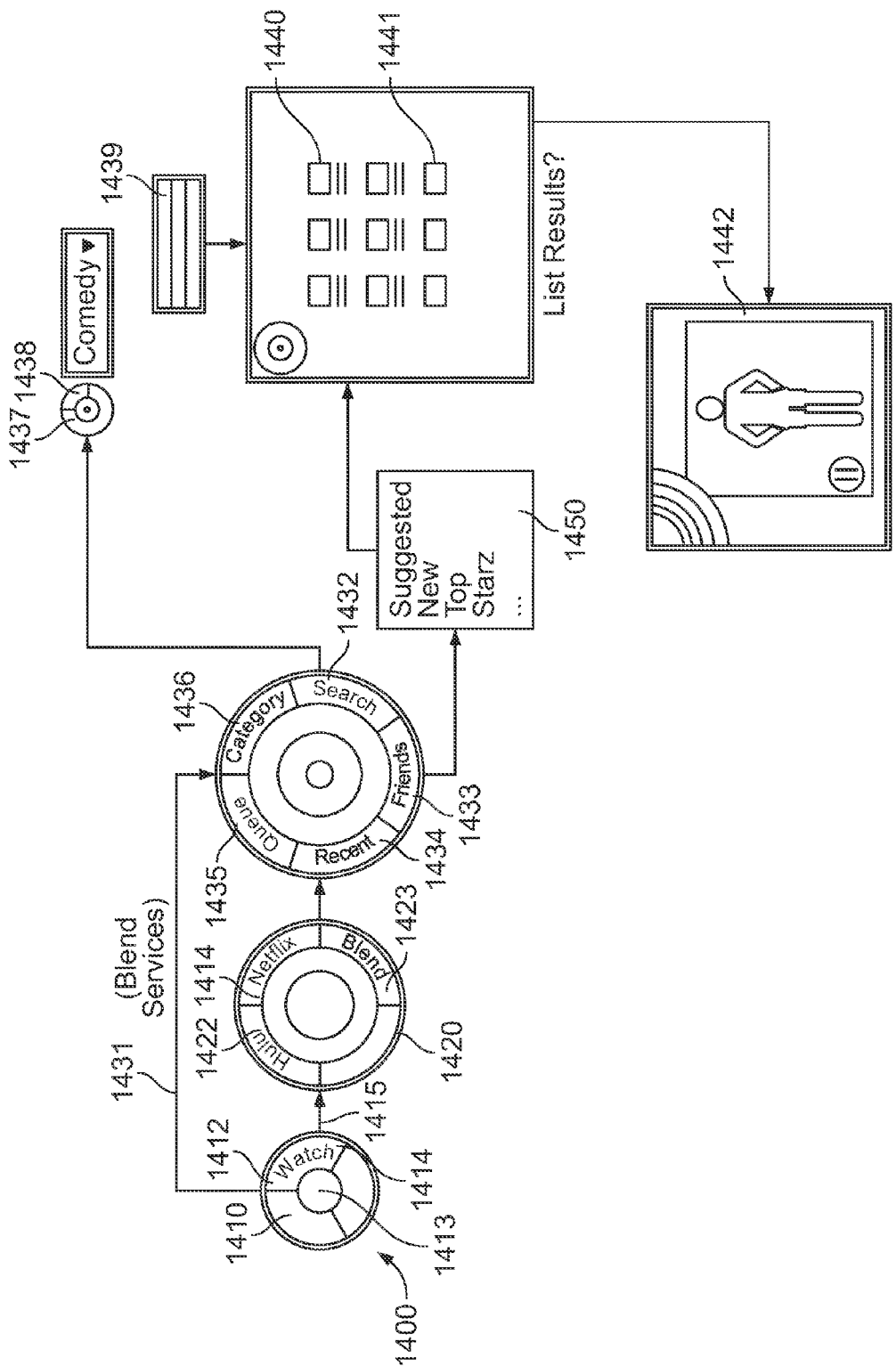
FIG. 14 illustrates an embodiment where the sprocket style user interface can find and view media.

FIG. 14 illustrates an embodiment showing how the sprocket style user interface, in any of the embodiments above, can be used both to find items such as media, and view the media. In FIG. 14, the first concentric wheel 1410 shown in general as menu 1400 can be an action wheel. One of the options 1412 is the watch option. The watch option as shown in FIG. 14 can actually have two parts which can be either separated, or have two active portions that can be selected, separated for example by a background color. The rightmost portion 1414 can be the option that brings up subscribed services. By selecting the option 1414, the user follows the flow of 1415 to obtain the first option set 1420. This may show the different channels that the user may have subscribed to, here, "Hulu" 1422, and "Netflix" 1414. The user can then select either of these channels for watching, which will bring up a screen showing the selected channel.

Alternatively, the user can select "watch" at 1415, and so then choose blended 1423 from the second concentric sprocket row in order to provide a third concentric sprocket row shown in 1430.

The alternative option is that 1413 follows the flow 1431 from "watch" directly to two additional sprocket concentric rows 1430. The blended services sprocket may allow users to find different things to watch, by searching at 1432, taking friend's suggestions at 1433, selecting recent items at 1434, look at the download item queue at 1435, and then defining items that are queued for watching at a later time and categories in 1436.

The user can select one of the categories of 1436, and obtain a new sprocket layer shown as 1437. This can be yet another concentric menu layer, or can be items from the layer exploded into separate items as shown. For example, the user can select a section 1438 of that sprocket layer representing a feature, e.g., comedy. Then the user receives a list of either subcategories at 1439, or the actual results at 1440.

In a similar way, users who select a category of 1433 may have some subcategory possibilities at 1450, such as friend-suggested, new categories, top categories, or "stars" which might represent the highest rated friend's suggestions. Selecting any one of those may provide the results of 1440. The user can then select one of the results of 1441, in order to receive the actual show at 1442.

Figure 15A:
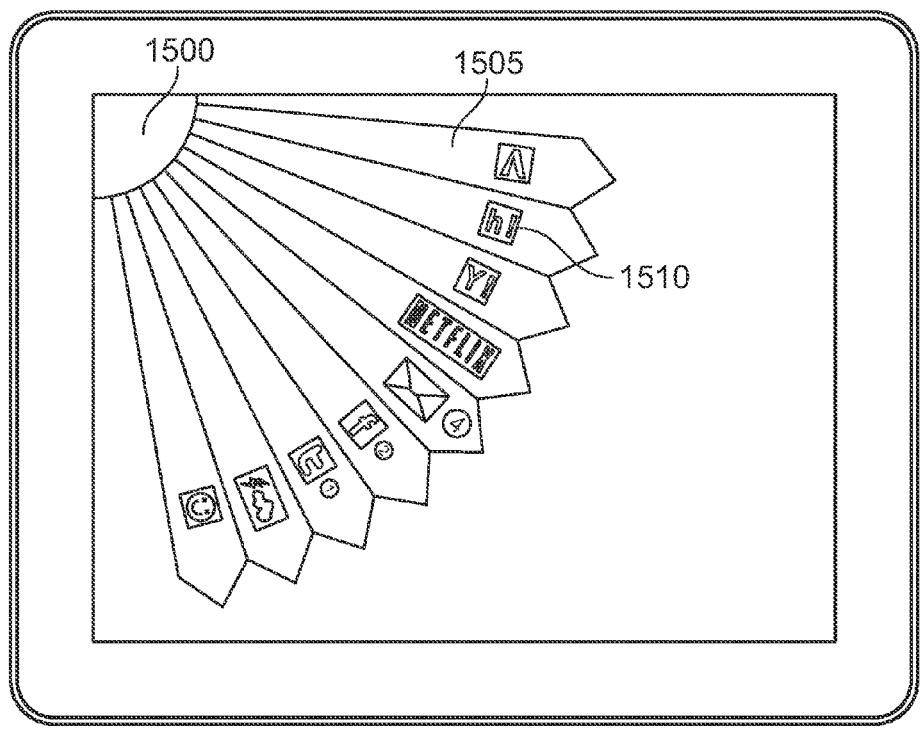
FIG. 15A shows an alternative sprocket interface with extending portions.
Figure 15B:
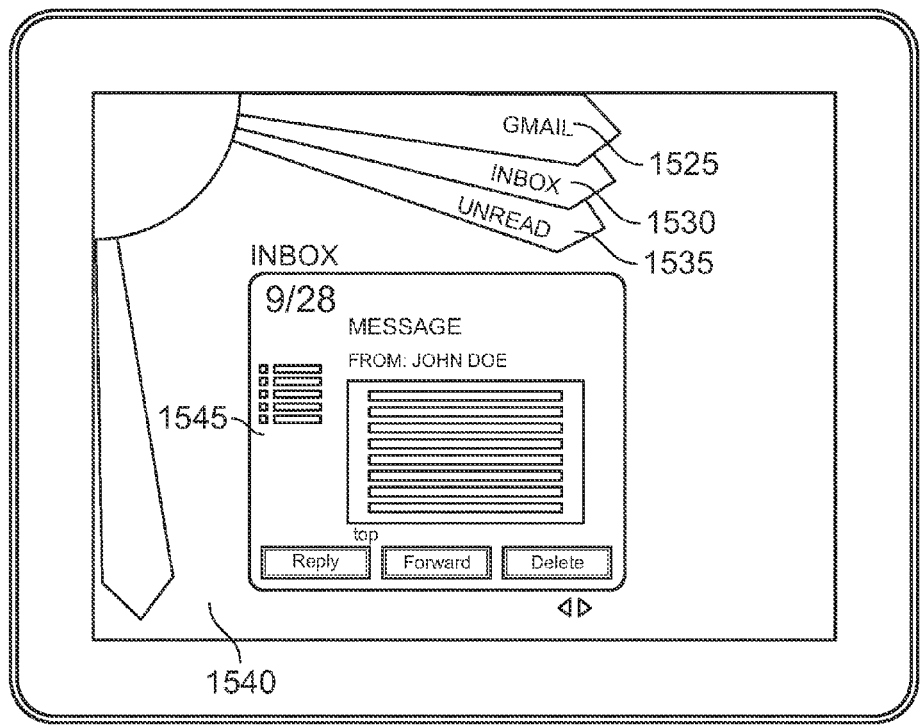
FIG. 15B shows an icon for a specific operation in the FIG. 15A embodiment.

An alternative sprocket user interface as shown in FIGS. 15 A-15B.

FIG. 15A shows the alternative sprocket interface, which is formed of a central portion 1500 as in previous embodiments, with a number of extending portions such as 1505. Each of the extending portions includes an icon 1510 on the extending portion which indicates the function of the extending portion. For example, icons can include icons for Netflix, Hulu, Yahoo, mail, Facebook, twitter, and others. Any commonly visited site can itself have an icon. For example, one icon such as shown in FIG. 15 B may be for Gmail at 1525. Selecting one of these icons brings up a concentric ring of possibilities for gmail. Here, the concentric ring may be slightly smaller in diameter than the main concentric ring. The possibilities, shown here as 1530 for the inbox and 1535 for the unread messages. Note that the concentric possibilities are actually inside the outer concentric ring defining Gmail. By making the main selection the largest concentric ring, this can have the largest number of possibilities therein. The secondary ring is exploded between items in the main ring, at a slightly smaller diameter. In other embodiments, this may be at the same diameter, but still set off from the main ring in some way.

The user can then select inbox at 1530, causing another break area 1540 within the sprocket. The break area shows the basic interface showing the message, and showing different options of what to do with the message such as return, forward, reply. In this way, the sprocket options are exploded inside the main layer, which explodes open for the options (such as inbox), and then explodes again for the content.

Figure 16A:
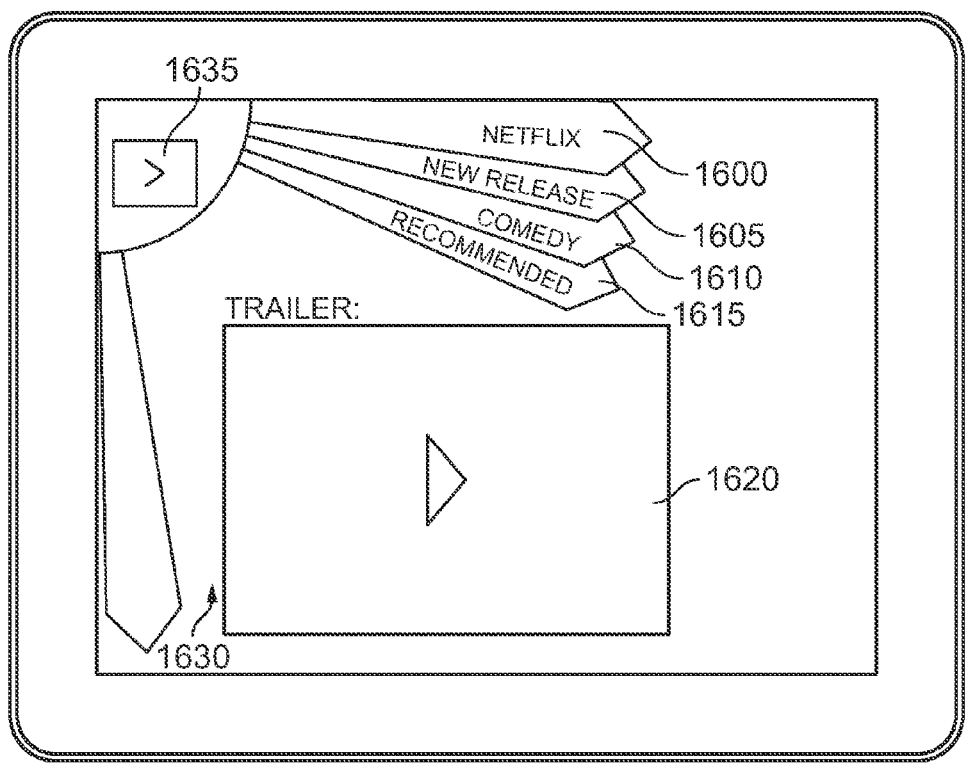
FIG. 16A shows a specific selection.
Figure 16B:
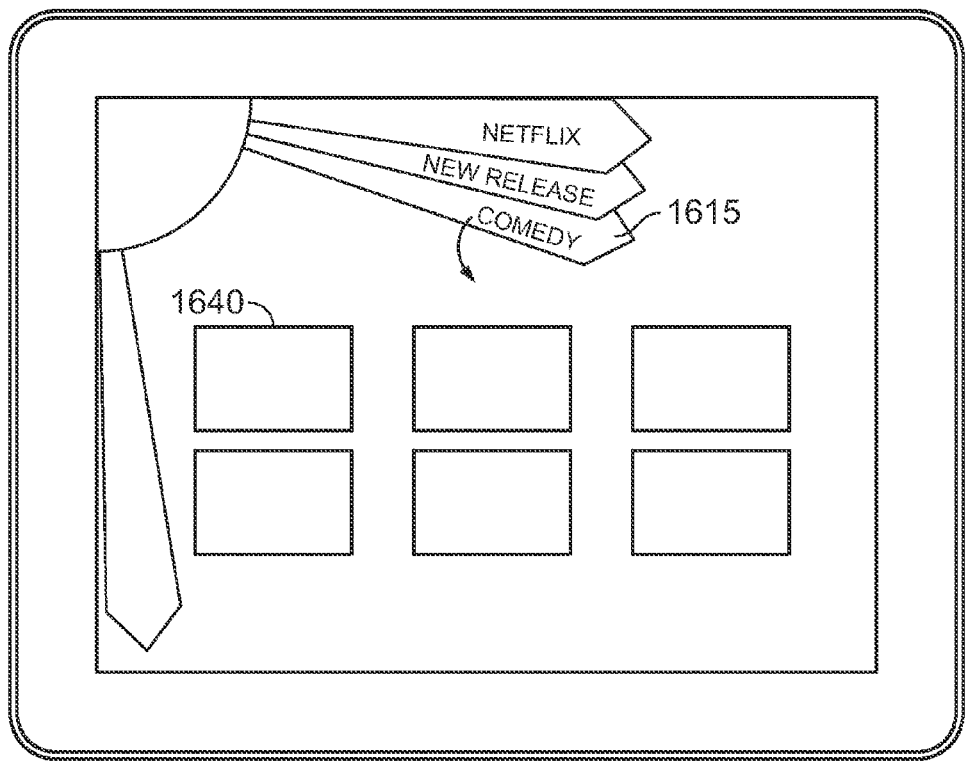
FIG. 16B shows the other options that are provided when a first option is selected.

In a similar way, FIG. 16A shows how the user can select the Netflix option at 1600, providing inner sub-options: 1605 to show new releases, 1610 to show comedy, and 1615 to show different recommendations. For any of the items, the user can be shown a trailer shown as 1620 in break portion 1630 inside the periphery of the sprocket outer portion. Alternatively, the trailer can be shown in the central ring of the sprocket shown as 1635 whenever an item is selected. The trailer can be for example for the most highly rated video. When the user has selected one suboption such as 1615, FIG. 16 B shows how this can bring up a number of different options, each options such as 1640 being one specific movie with different possibilities of the movie, and another possibility to show the different things that can be seen.

This provides two different sets of items, the overall user interface shown in FIG. 15A, where all the different options are possible, down to a drilled down portion where user can see more details about any selected items.

Figure 17:
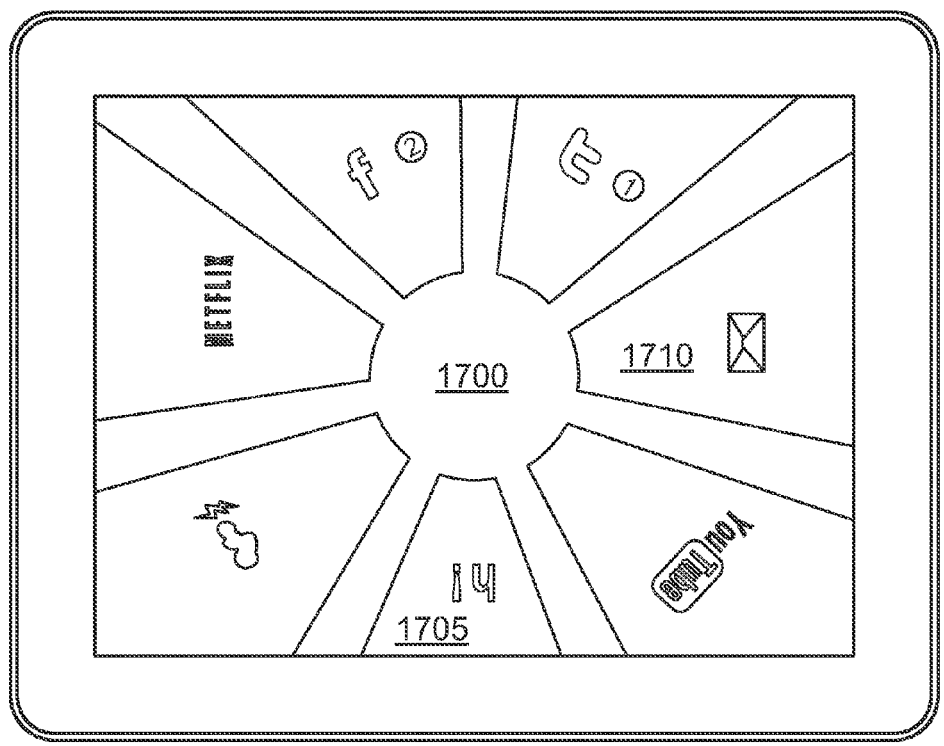
FIG. 17 shows a dashboard embodiment.

The dashboard embodiment can alternatively be embodied as shown in FIG. 17 where the central hub 1700 can be surrounded by different areas such as 1705 which each may be represented by showing an icon or other indication of what will be shown. For example, by selecting the mail icon section 1710, more detail about the mail may be provided in a similar way to that shown in FIG. 15 B, by opening a break portion inside the cylindrical portion.

Figure 18A:
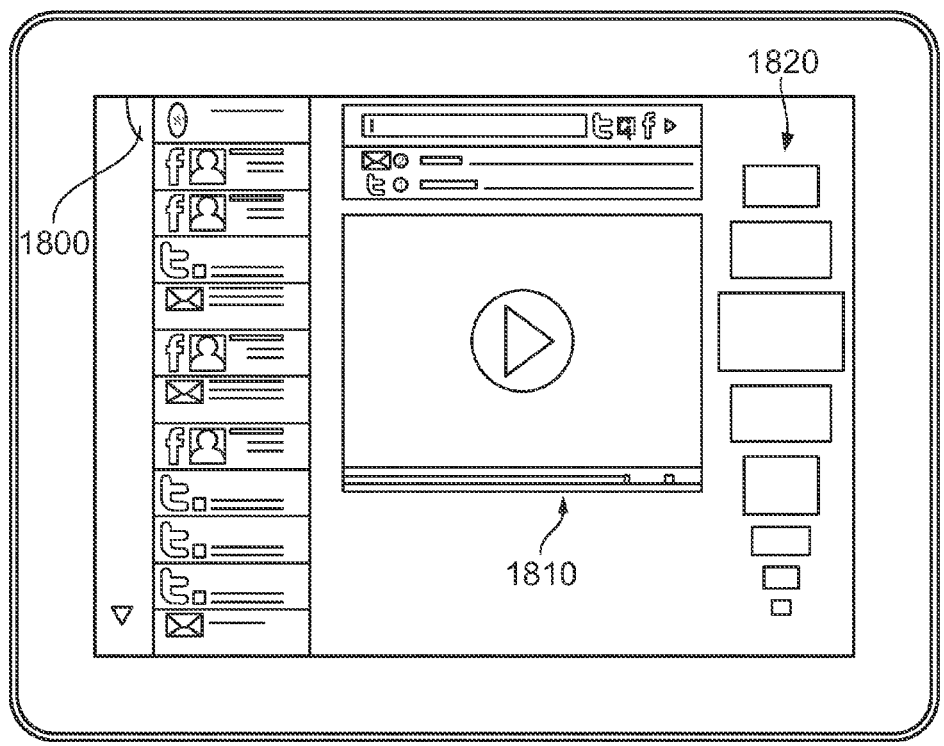
FIG. 18A shows an interface which is side-by-side with the content.

FIG. 18A represents another embodiment in which the sprocket type user interface is prevented side-by-side with its contents. For example, both the social stream and the media stream may be presented side-by-side. Both of these streams may be aggregated to contain elements from a variety of services. The user can use the "filter wheel" to limit the types of results that appears in their stream.

Figure 18B:
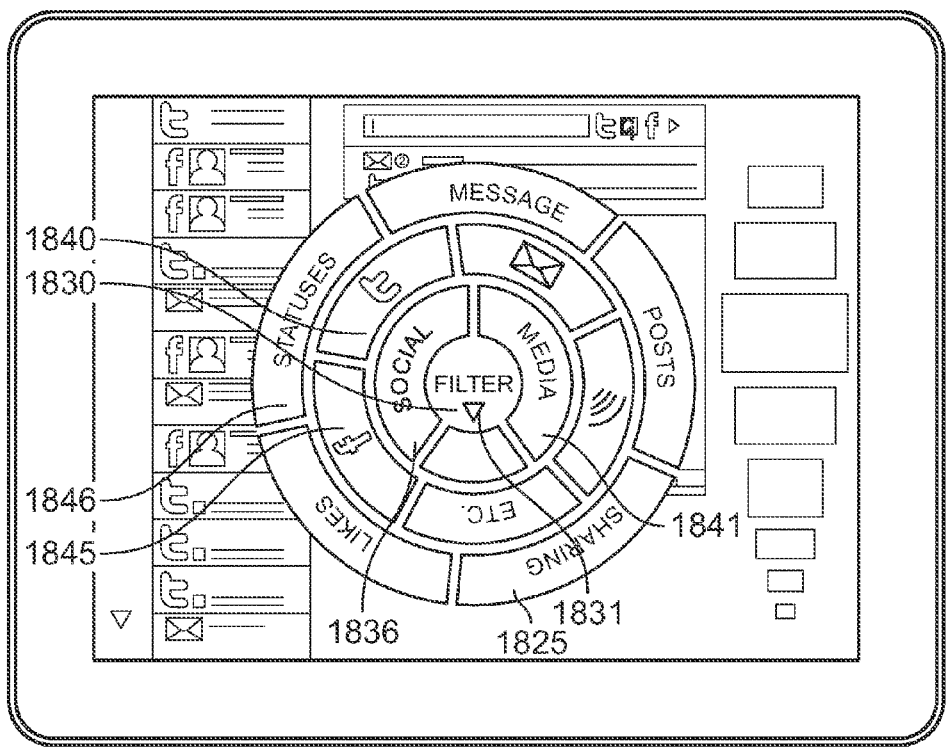
FIG. 18B shows a wheel shaped embodiment showing likes and dislikes.
Figure 18C:
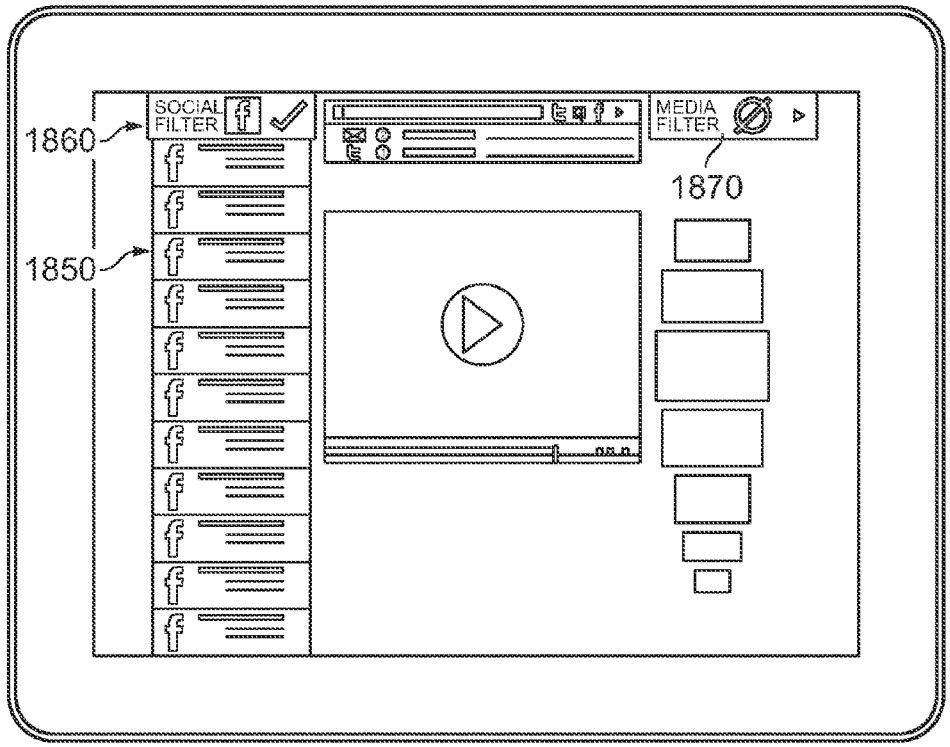
FIG. 18C shows a side-by-side embodiment that shows a viewing pane.
Figure 18D:
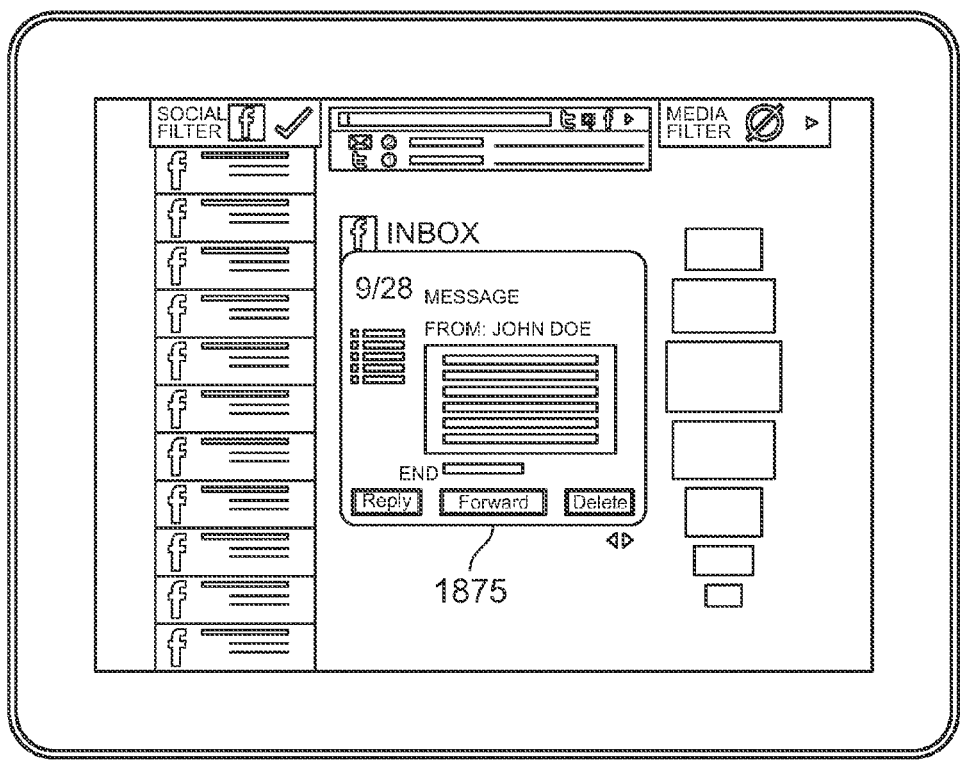
FIG. 18D shows a message in the viewing pane.

The leftmost section 1800 may be the different social network information that is obtained at any one time. The central section 1810 can be a messaging section, with the rightmost section 1820 providing options for the messaging section. Any time the user wants to filter or change what is being shown, they can select the filter wheel shown in FIG. 18B. The filter wheel allows changing what is being shown. For example, the filter 1831 may choose what is being done by the wheel, here filtering shown as 1830. The user can select what is being filtered, hereby selecting the social icon at 1835, the user receives a concentric ring at 1840 around the filtered icon indicating specifically what is being filtered. By selecting social here, the user receives a number of different icons including Facebook in 1845, twitter, mail, and others. The user can alternatively select to filter by media by selecting 1841

By selecting Facebook in 1845, the user receives yet another concentric wheel 1825 that indicates the different things that the user might want to select. The user can select any of these items, to have them shown the list. The different items shown may include sharing, likes, statuses, message, and posts. Here, the user has selected only statuses at 1846. This produces for subsequent viewing FIG. 18 C, where the social stream 1850 has been filtered to only show statuses. At the same time an icon 1860 is eliminated indicating that the social filter is in play, and the icon 1870 shows that the media filter is not in play. The user can also obtain a picture of their Facebook inbox at 1875, and can use the media stream area to respond in this way.

Figure 19A:
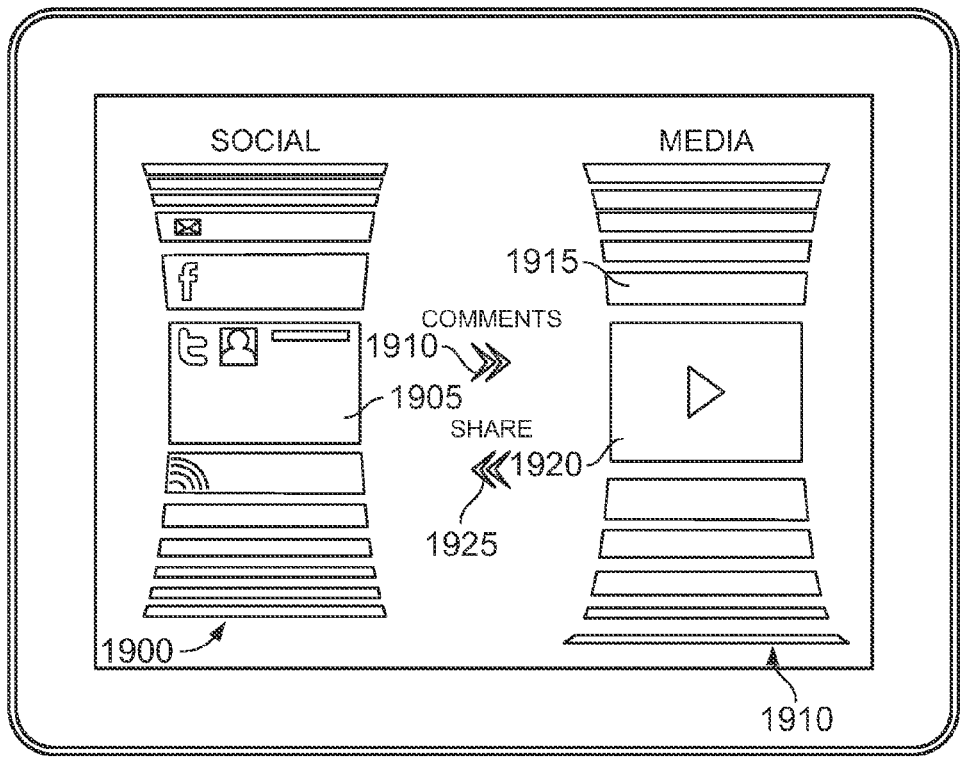
FIG. 19A shows a side-by-side embodiment.
Figure 19B:
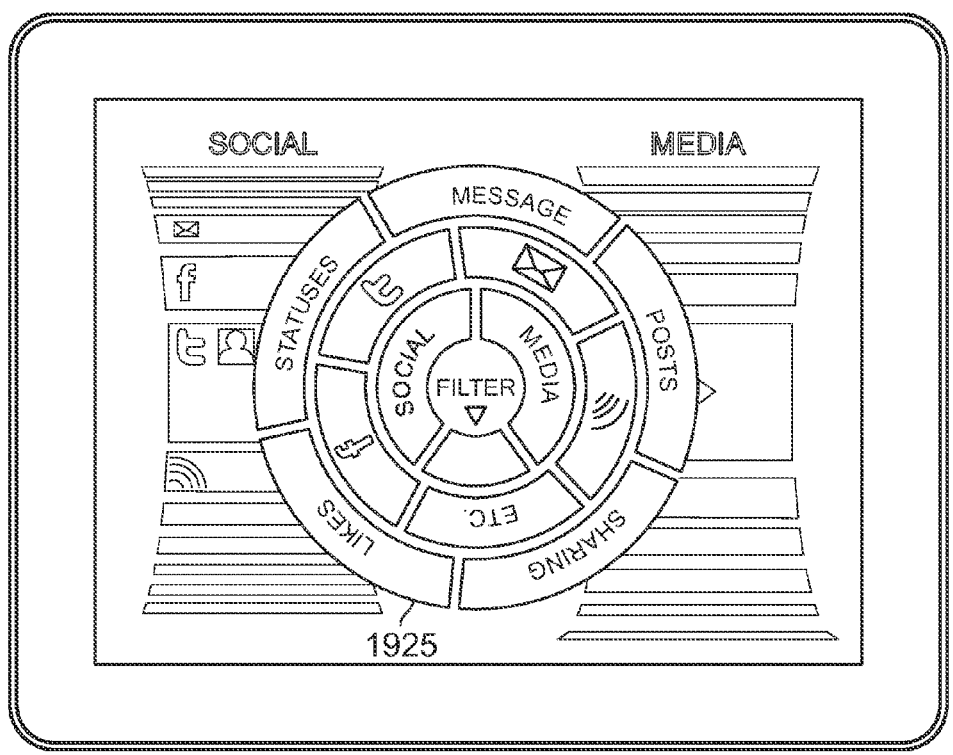
FIG. 19B shows the filter wheel used for likes and dislikes.

FIG. 19A illustrates an alternative embodiment of the dual stream operation, showing the social stream 1900 and the media stream 1910 side-by-side. Both streams are aggregated to contain elements from a variety of services as in the above. The user can thus see items from the social stream such as

Figure 19C:
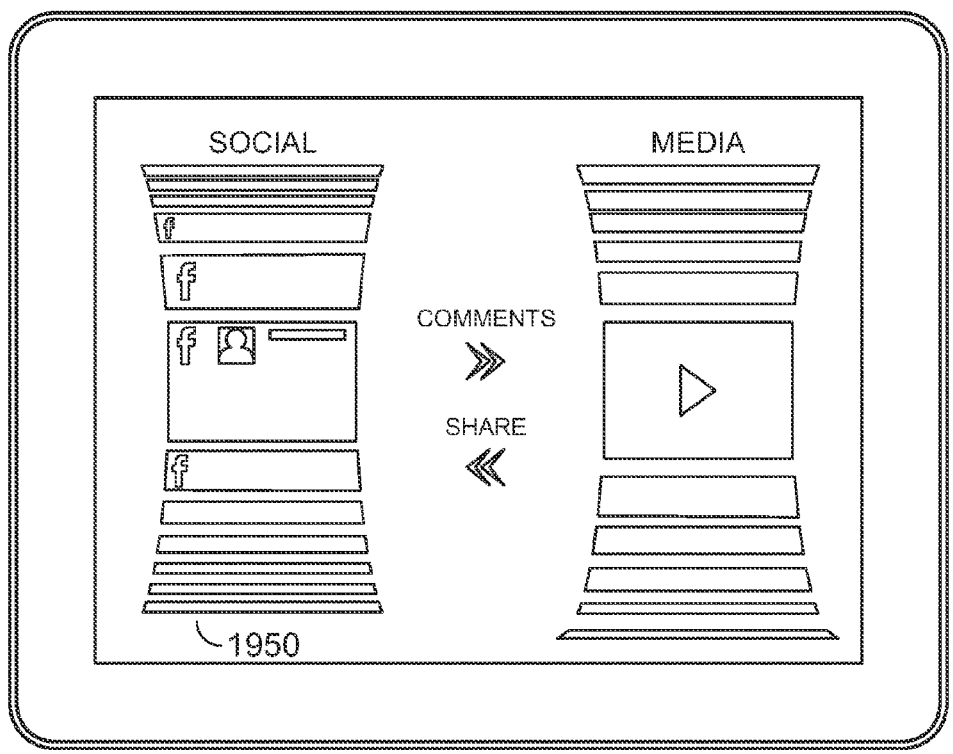
FIG. 19C shows how the filter can be rearranged to form a side-by-side embodiment.

1905, and has options for example to comment on those items at 1910. The commenting on the item in 1910 may bring up for example an e-mail window 1915 that allows the user to comment. In a similar way, the media stream 1910 may show different media such as 1920. The user may have the option 1925 to share this with one or more items in the social network. In this embodiment, the filter wheel 19B can also be used in a similar way, with the filter wheel 1925 showing the different items that are shown in the screen. By executing the filter wheel, the user may receive the items as shown in FIG. 19C, which now shows the social stream 1950 being only Facebook, in accordance with what has been selected in the menu of 1925. For example, by selecting Facebook, the social stream includes only Facebook items.

FIG. 20 shows an alternative embodiment in which all the services and content is formed into one shifting landscape shown as 2000. The sprocket is shown in a honeycomb arrangement, with the different items that are shown. The user can drag the honeycomb in different directions by touching the honeycomb, and thereby focus on different interests areas. FIG. 20A shows a first zoom amount, while FIG. 20B shows a more compressed view, showing how the honeycomb can grow by including other items in the honey file.

Figure 20A:
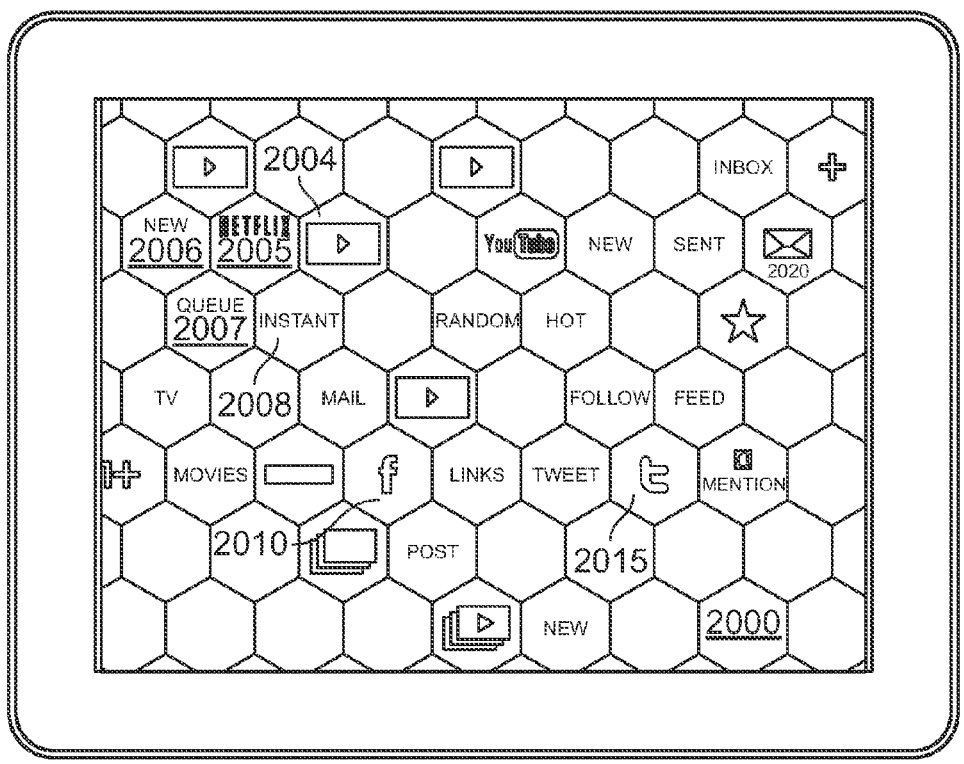
FIG. 20A shows a shifting landscape embodiment.
Figure 20B:
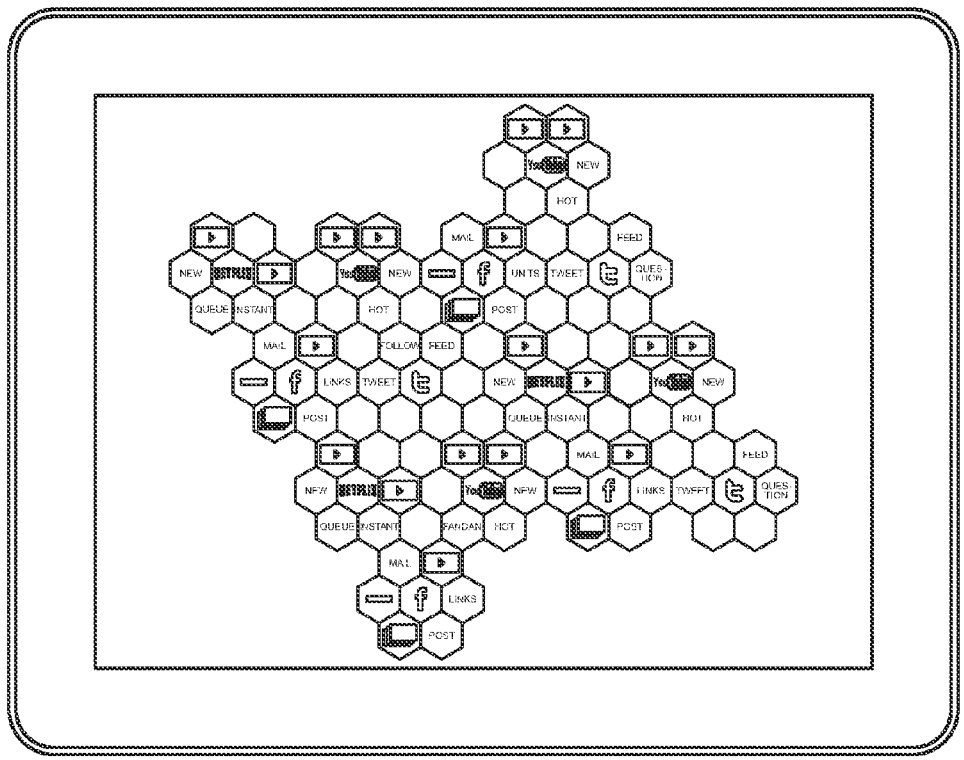
FIG. 20B shows a further zoomed embodiment.
Figure 20C:
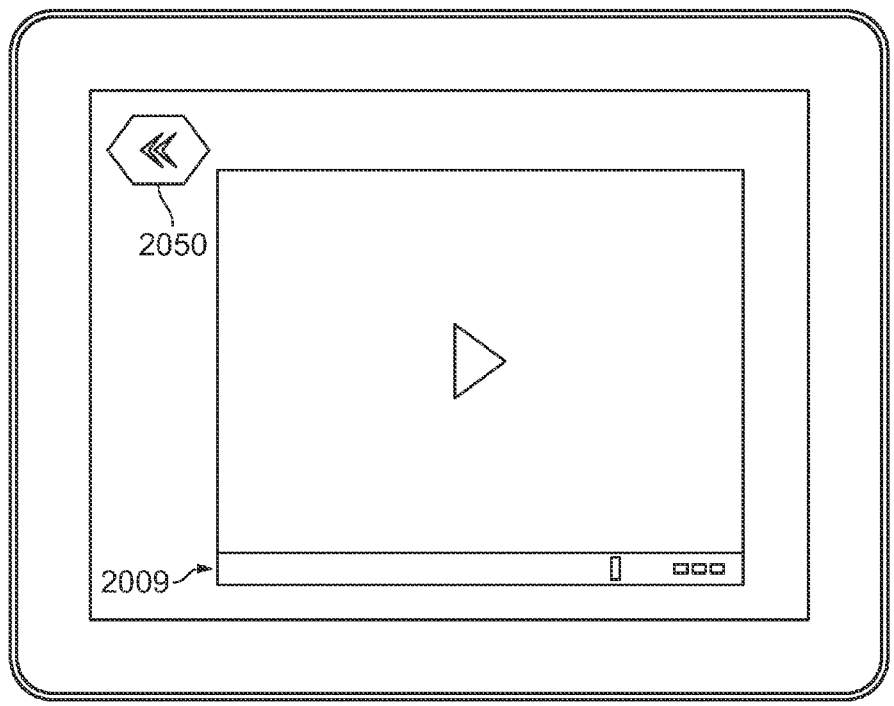
FIG. 20C shows a playing screen.
Figure 20D:
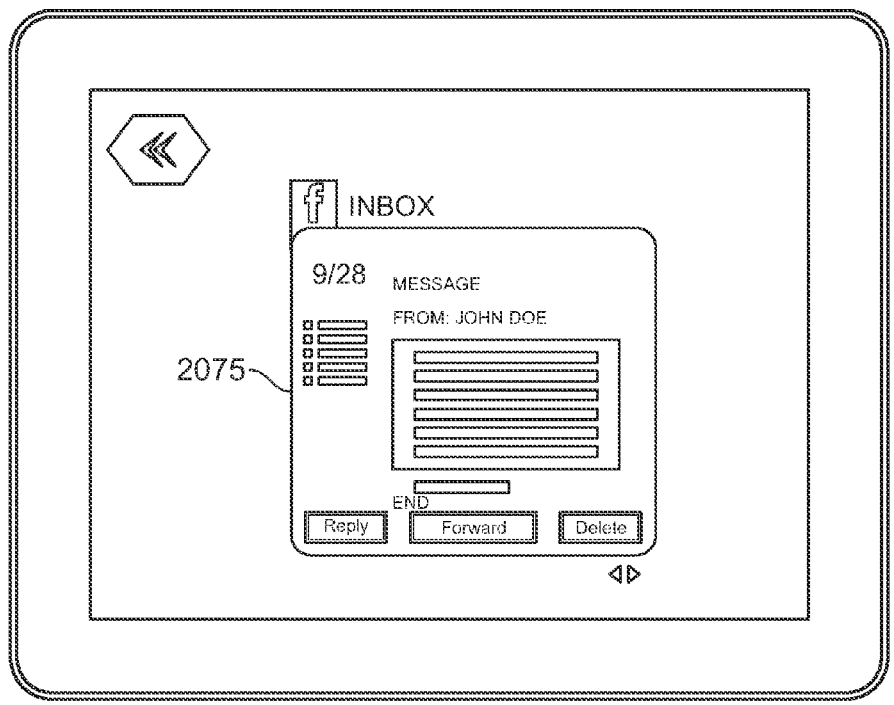
FIG. 20D shows how one of the cells of the shifting landscape can turn into a message creation.

The items are still arranged in a circular hierarchy. FIG. 20A, however, shows how for example the Netflix icon 2005 can be surrounded by the different items can coordinate with such as new at 2006, queue items at 2007, and instant items at 2008. The user can play any of these items by selecting the play icon 2009. In a similar way, Facebook 2010 may be surrounded by different items, twitter 2015, and mail 2020. By bringing up the play icon such as 2009, this brings up the screen of FIG. 20C, in which the play icon has become the entire screen. The user can also execute the icon 2050 to return to the main selection menu. In a similar way, the Facebook icon in FIG. 20 D has an inbox can bring up the Facebook inbox screen shown as 2075, allowing the user to interact with the Facebook icon. This enables a continual change in the items that are seen.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent those skilled in the relevant art. Various embodiments may also be implemented using a combination of both hardware and software.

While the particular systems and methods for navigating a dynamic collection of information herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other combinations of codes can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals. The above has described the system, but it should be understood that the system includes all of the client computer, the server computer that serves the information, the method of carrying out the operation, as well as the software and process steps themselves, both alone and as embodied on a machine-readable non-transitory medium.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer, operating using a processor and a display screen to display a menu and to accept selections from the menu,
where said processor produces an output indicative of a menu that is substantially in the shape of at least a portion of a circle having multiple different ring portions, where items on the menu can be selected, and where selecting the items on the menu changes content which is shown in other portions of the menu, to show content that is associated with the selected item on the menu, said processor operating to determine, when a first item has been selected from a first ring portion of the menu, other content associated with the first item for displaying on a second ring portion of the menu different than the first ring portion of the menu, by determining if the item has been selected previously within a specified update time, if not, receiving over a network connection, update information for said content associated with the item, and displaying said other content including said update information responsive to said item being selected, and if the item has been selected previously within the specified update time, then displaying already-stored information associated with the item without checking for an update and using previously downloaded information, without contacting a server, and where said output comprises multiple different rectangular display portions, each of said multiple different rectangular display portions showing a display of a specific option based on the selected item, where said multiple different rectangular display portions is not part of said ring portions and is created as a break between said first item in the ring portions and another item in the ring portions when said first item is selected, where said break is not shown before said item is selected.

2. A computer as in claim 1, wherein said display screen is a touchscreen, and said selecting comprises detecting a touch on the touch screen.

3. A computer as in claim 1, wherein said menu is in the form of concentric rings, and selecting an item on one of said rings changes information on another of said rings.

4. A computer as in claim 3, wherein said another of said rings is an outwardly concentric ring.

5. A computer as in claim 3, wherein said another of said rings is an inwardly concentric ring.

6. The computer as in claim 3, wherein said items on the menu that can be selected include both applications and video selection items, including all of a social network, a channel guide, a studio, a media library, and favorites.

7. The computer as in claim 3, wherein said items on the menu that can be selected include a favorites item, that allows selecting an advertising that is displayed as part of said menu.

8. The computer as in claim 3, wherein said items on the menu include a channel guide, wherein said channel guide when shown on a mobile phone screen includes only channels that can be seen on a mobile phone screen, and where said channel guide shown on another screen includes other channels that can be seen on said another screen but cannot be seen on said mobile phone screen.

9. A computer, operating using a processor and a display screen to display a menu and to accept selections from the menu,
where said processor produces an output indicative of a menu that is substantially in the shape of at least a portion of a circle having multiple different ring portions, where items on the menu can be selected,
said processor detecting a selection of an item on the menu to change the content which is shown in other portions of the menu, to show content that is associated with the selected item on the menu, said processor operating to, when a first item has been selected from a first ring portion of the menu, form a display portion associated with said first item, where said display portion comprises multiple different rectangular display portions, each of said multiple different rectangular display portions showing a display of a specific option based on the selected item, where said multiple different rectangular display portions is not part of said rings and is created as a break between said first item in the rings and another item in the ring when said first item is selected, where said break is not shown before said item is selected.

10. A computer as in claim 9, wherein selecting said first item in the ring also causes other content associated with the first item for displaying on a second ring portion of the menu different than the first ring portion of the menu, by determining if the item has been selected previously within a specified update time, if not, receiving over a network connection, update information for said content associated with the item, and displaying said other content including said update information responsive to said item being selected, and if the item has been selected previously within the specified update time, then displaying already-stored information associated with the item without checking for an update.

11. A computer as in claim 9, wherein said display screen is a touchscreen, and said selecting comprises detecting a touch on the touch screen.

12. A computer as in claim 10, wherein said menu is in the form of concentric rings, and selecting an item on one of said rings changes information on another of said rings.

* * * * *